United States Patent
Fino et al.

Patent Number: 5,991,769
Date of Patent: Nov. 23, 1999

[54] SYSTEM FOR FACILITATING HOME CONSTRUCTION AND SALES

[75] Inventors: Timothy A. Fino, Farmington; Stephan E. Hall, Birmingham, both of Mich.

[73] Assignee: Pulte Home Corporation, Bloomfield Hills, Mich.

[21] Appl. No.: 08/919,091

[22] Filed: Aug. 27, 1997

Related U.S. Application Data

[62] Division of application No. 08/387,541, Feb. 13, 1995, Pat. No. 5,689,705.

[51] Int. Cl.$^6$ .................................................... G06F 17/30
[52] U.S. Cl. ......................... 707/104; 345/425; 345/133; 345/141
[58] Field of Search .................................. 345/425, 133, 345/141; 707/104

[56] References Cited

U.S. PATENT DOCUMENTS

| | | | |
|---|---|---|---|
| 4,275,449 | 6/1981 | Aish | 364/512 |
| 4,555,775 | 11/1985 | Pike | 364/900 |
| 4,634,845 | 1/1987 | Hale et al. | 235/350 |
| 4,653,020 | 3/1987 | Cheselka et al. | 364/900 |
| 4,870,576 | 9/1989 | Tornetta | 364/401 |
| 4,876,648 | 10/1989 | Lloyd | 364/408 |
| 5,032,989 | 7/1991 | Tornetta | 364/401 |
| 5,036,315 | 7/1991 | Gurley | 340/721 |
| 5,041,992 | 8/1991 | Cunningham et al. | 364/518 |
| 5,043,711 | 8/1991 | Harrington | 340/728 |
| 5,045,994 | 9/1991 | Belfer et al. | 364/200 |
| 5,063,375 | 11/1991 | Lien et al. | 340/703 |
| 5,088,033 | 2/1992 | Binkley et al. | 395/500 |
| 5,111,392 | 5/1992 | Malin | 364/401 |
| 5,182,705 | 1/1993 | Barr et al. | 364/401 |

(List continued on next page.)

OTHER PUBLICATIONS

Gebhardt Associates Letter dated Apr. 13, 1994.
SureSell Pamphlet, No Date.
Computer Assisted Data Base search results, No Date.
Gayle et al, Environmental Online: The Geening of Databases, Dialog, Aug. 1992.
Oneugbe et al, Query processing in LVD: A secure Database System, IEEE, pp. 118–124, Dec. 1988.
Knode et al, Making Databases Secure with TRUDATA Technology, IEEE, pp. 82–90, Dec. 1998.
Gayle et al, Environmental Online: The Geening of Databases, Dialog, pages, Aug. 1992.
Oneugbe et al, Query processing in LVD: A Secure Database System, IEEE, pp. 118–124, Dec. 1988.
Knode et al, Making Databases Secure with TRUDATA Technology, IEEE, pp. 82–90, Dec. 1988.

*Primary Examiner*—Thomas G. Black
*Assistant Examiner*—Frantz Coby
*Attorney, Agent, or Firm*—Rader, Fishman & Grauer PLLC

[57] ABSTRACT

A system for facilitating the information transfer and processing associated with home construction and home sales. Various discrete software modules are disclosed each handling a specific task associated with home construction and sales. Also, a system for communicating between separate data bases is disclosed wherein separate and distinct sales offices, each having their own data base, may communicate with a parent, market office having its own data base wherein the data bases of the sales offices and the market office are synchronized according to the method of the present invention so that any data updates in any of the sales offices would be automatically updated in the associated market offices. This aspect of the present invention allows a corporation responsible for home construction and sales amongst various regional, market, and sales offices to coordinate a plurality of discretely separate data bases in a way such that they are all synchronized with one another at a predetermined time.

4 Claims, 46 Drawing Sheets

U.S. PATENT DOCUMENTS

| | | | |
|---|---|---|---|
| 5,189,606 | 2/1993 | Burns et al. | 364/401 |
| 5,231,567 | 7/1993 | Matoba et al. | 364/468.06 |
| 5,233,513 | 8/1993 | Doyle | 364/401 |
| 5,233,533 | 8/1993 | Edstrom et al. | 364/468 |
| 5,235,680 | 8/1993 | Bijnagte | 395/161 |
| 5,239,462 | 8/1993 | Jones et al. | 364/408 |
| 5,241,465 | 8/1993 | Oba et al. | 364/401 |
| 5,249,120 | 9/1993 | Foley | 364/401 |
| 5,255,181 | 10/1993 | Chapman et al. | 364/401 |
| 5,268,838 | 12/1993 | Ito | 364/401 |
| 5,274,547 | 12/1993 | Zoffel et al. | 364/408 |
| 5,274,567 | 12/1993 | Kallin et al. | 364/478 |
| 5,287,504 | 2/1994 | Carpenter et al. | 395/600 |
| 5,289,368 | 2/1994 | Jordan et al. | 364/401 |
| 5,289,574 | 2/1994 | Sawyer | 395/157 |
| 5,310,997 | 5/1994 | Roach et al. | 235/375 |
| 5,491,818 | 2/1996 | Malatesta et al. | 395/600 |
| 5,532,838 | 7/1996 | Barbari | 358/400 |
| 5,592,664 | 1/1997 | Starkey | 395/600 |
| 5,594,226 | 1/1997 | Steger | 235/379 |
| 5,644,334 | 7/1997 | Jones et al. | 345/119 |
| 5,689,705 | 11/1997 | Fino et al. | 707/617 |
| 5,754,850 | 5/1998 | Janssen | 707/104 |

Sales - [Plan Selection]

People | Lots | Plan | Elev | Options | Scenario | | Contr. | Clear | Reports | Quit
---|---|---|---|---|---|---|---|---|---|---
Josef | 104 | Sunrise | C | $22,865 | | 211,565 | Approved | Sub Map | Chg Sub |

| Description | Style | Sq. Ft. | Bdrm | Baths | Levels | W X D | Price | New Price -- Date | Plan |
|---|---|---|---|---|---|---|---|---|---|
| Avalon | Ranch | 1524 | 3 | 2 | 1 | 35 X 62 | $101,000 | | 1524 |
| Lexington | Ranch | 1630 | 3 | 2 | 1 | 35 X 60 | $99,900 | | 1630 |
| Pine Valley | Ranch | 1638 | 3 | 2 | 1 | 40 X 62 | $97,400 | | 1638 |
| Regency | Colonial | 2418 | 4 | 4 | 2 | 44 X 48 | $194,900 | | 2418 |
| Sunrise | Two-Story | 3305 | 5 | 2 1/2 | 2 | 55 X 56 | $186,400 | | 3305 |

122 → Show Plans

Cancel

Done

Mkt: Test Market  Comm: Excalibur  Phase: One    Pickplan-0.39    1.62A

FIG. 2A

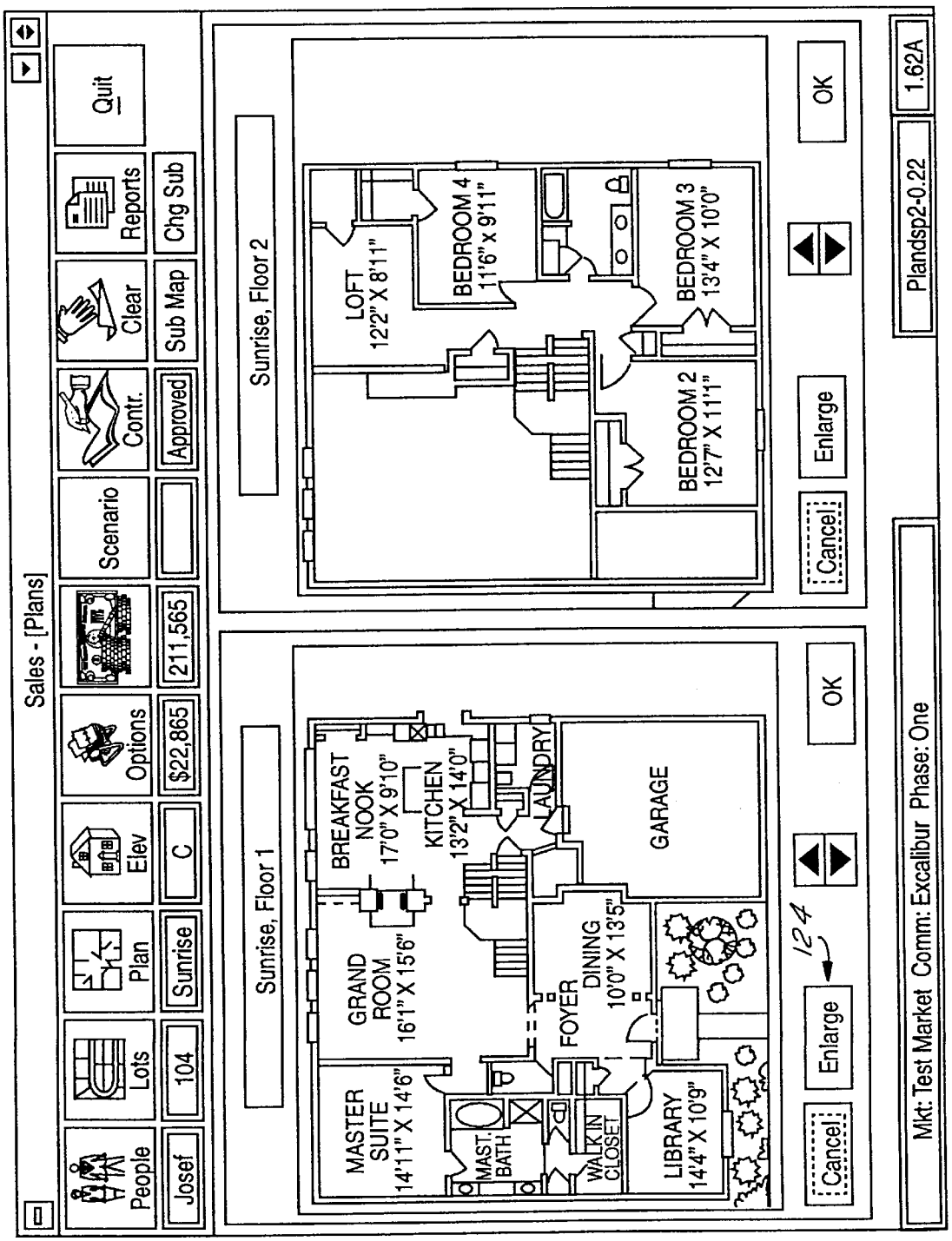

Sales - [Options]

| People | Lots | Plan | Elev | Options | Scenario | Contr. | Clear | Reports | Quit |
|---|---|---|---|---|---|---|---|---|---|
| Josef | 104 | Sunrise | C | $22,865 | | Approved | Sub Map | Chg Sub | |
| | | | | $211,565 | | | | | |

Option Categories
- ☒ Flooring
- ☒ Appliances
- ☒ Bathroom
- ☒ Electrical
- ☐ Fireplace
- ☒ Kitchen
- ☐ Trim
- ☒ Pools_Spas
- ☐ Miscellaneous

| Qty | Description | Total |
|---|---|---|
| 1 | Whirlpool Tub | 1300 |
| 1 | Washer & Gas Dryer | 800 |
| 1 | WOW Gas Range | 175 |
| 1 | 3rd Upgrade Carpet | 1950 |
| 1 | Upgrade Carpet Pad | 275 |
| 1 | Raised Panel Cabinets | 825 |
| 1 | Cabinets in Laundry | 275 |
| 1 | 90' Diving Pool | 11450 |
| 1 | Spa package with Pool | 4000 |
| 1 | Pool Fence | 1250 |
| 1 | Overhead Lights | 200 |
| 6 | Additional Phone Jack | 240 |
| 1 | Electrical Outlet Package | 125 |

Qty ◀ ▶

Total Options $22,865

Done    OK

Mkt: Test Market  Comm: Excalibur  Phase: One    Options-0.57    1.62A

Sales - [Options]

| People | Lots | Plan | Elev | Options | Financing | Scenario | Contr. | Clear | Reports | Quit |
|---|---|---|---|---|---|---|---|---|---|---|
| Josef | 104 | Sunrise | C | $22,865 | 211,565 | | Approved | Sub Map | Chg Sub | |

Fireplace

☐ Sand Finish Fireplace @ $300 (1002)
☐ Fireplace B @ $2600 (1003)
☐ Fireplace E @ $2500 (1004)
☐ Fireplace Y @ $2200 (1005)
☐ Fireplace Doors @ $250 (1010)

| Qty | Description | Total |
|---|---|---|
| 1 | Whirlpool Tub | 1300 |
| 1 | Washer & Gas Dryer | 800 |
| 1 | WOW Gas Range | 175 |
| 1 | 3rd Upgrade Carpet | 1950 |
| 1 | Upgrade Carpet Pad | 275 |
| 1 | Raised Panel Cabinets | 825 |
| 1 | Cabinets in Laundry | 275 |
| 1 | 90' Diving Pool | 11450 |
| 1 | Spa package with Pool | 4000 |
| 1 | Pool Fence | 1250 |
| 1 | Overhead Lights | 200 |
| 6 | Additional Phone Jack | 240 |
| 1 | Electrical Outlet Package | 125 |

Qty ◀▶

Total Options $22,865

Done    OK

Mkt: Test Market  Comm: Excalibur  Phase: One    Options-0.57    1.62A

FIG. 3B

FIG. 4C

Sales - [How Much Home]

| People | Plan | Elev | Options | Scenario | Contr. | Clear | Sub Map | Reports | Chg Sub | Quit |

Josef | Lots 104 | Sunrise | C | $22,865 | $211,565 | Approved

Select A Loan
- Cash Sale
- Conventional, ARM
- Conventional, Fixed
- FHA, ARM
- FHA, Fixed
- VA, ARM
- VA, Fixed

128

Loan Information
Loan Term/Rate
30 Years
8.5 Rate

Points
0 Discount

Max. LTV  95  %
Top Ratio  Bottom Ratio
33         38

130

Financial Information
Monthly Payment  $1,200
Available Cash   $65,000

Compute Using
- ● Payment & Available Cash
- ○ Income & Available Cash
- ○ Payment Only
- ○ Income Only
- ○ Available Cash Only

132

You Can Afford a Home Priced at:        $191,000
Your Loan Amount Would Be:              $131,000
Your Move In Costs Would Be:            $64,500
Your Monthly Payment (Including Fees) Would Be:  $1,222

134

Fees

Amortization Table

Print

Done

This estimate is based upon the mortgage information made available to us by ICM Mortgage Corp. This is neither a quotation of rates or an offer to lend. Exact quotations can be obtained directly form ICM Mortgage or your mortgage lender. All amounts are approximated.

Mkt: Test Market  Comm: Excalibur  Phase: One | HowMch-Home-0.3 | 1.62A

FIG. 4D

Sales - [Mortgage Pre-Qualification]

People | Lots | Plan | Elev | Options | Scenario | Contr. | Clear | Sub Map | Reports | Quit
Josef | 104 | Sunrise | C | $22,865 | 211,565 | Approved | | | | Chg Sub Mortgage Pre-Qualification Your qualification analysis is based on a $200,950 Conventional, Fixed, 8.5% Interest Rate. 30 years mortgage with 5.02% down.

Based upon your monthly income of [$103,600]

Your existing monthly payment of [$600]

The lender likes:

Your Ratios

Top [2] [33]

Bottom [2] [38]

Congratulations!
You can qualify for this
house using the above
Financing Vehicle!

— 134

This pre-qualification is based upon profile mortgages supplied to us by ICM Mortgage Corp. This is only an estimate. Actual qualification will be done by you through ICM Mortgage or your mortgage lender. ICM can offer additional mortgage programs for which you may qualify.

OK

Mkt: Test Market  Comm: Excalibur  Phase: One | FinQualI-0.19 | 1.62A

FIG. 4E

Sales - [ ]

| People | Lots | Plan | Elev | Options | | Scenario | Contr. | Clear | Sub Map | Reports | Quit |
| Josef | 104 | Sunrise | C | $22,865 | 211,565 | | Approved | | | Chg Sub | |

Homeowner's Tax Benefits

Your tax analysis is based on a $200,950 Conventional, Fixed, 8.5% Interest Rate, 30 year mortgage with 5.02%

After 1 year | After 5 Years | Basis + Income

Income tax, without owning a home: $461,841
Income tax, as a homeowner $461,841
Increase in Home Equity $12,037

Tax Benefits are estimated using federal income tax schedules. Since each individual's tax structure can vary, your tax benefits may be different.

Monthly Benefit

Cash tax reduction $0
Equity ownership $122
Owner value of inflation $882

Total Monthly Benefit $1,003

Total monthly payment: $1,877
Less cash tax reduction: $0
Net cash cost per month: $1,877

OK

Mkt: Test Market  Comm: Excalibur  Phase: One    FinTax3-0.25    1.62A

Sales - [Contract Processing]

People | Lots | Plan | Elev | Options | Scenario | Contr. | Clear | Reports | Quit
Josef | 104 | Sunrise | C | $22,865 | 211,565 | | | | Chg Sub | Sub Map Contract Name | Lot | Blk | Phase | Plan | Stat
Spec Home | 88 | 00 | One | Sunrise | Approved SalesLINC STOP This will create a contract for Josef Johanssen continue?

[Yes] [No]

Modify Contract
Create Contract
Change Orders
Cancel Contract
Mortgage Transfer
Reprint Contract Done Mkt: Test Market Comm: Excalibur Phase: One | Cntract-0.53 | 1.62A

FIG. 5C

Sales - [Contract Preview]

| People | Lots | Plan | Elev | Options | Scenario | Contr. | Clear | Sub Map | Reports | Quit |
| Josef | 104 | Sunrise | C | $22,865 | | | | | Chg Sub | |

Sales Contract Preview
Excalibur

Modify contract for

Buyer 1: Josef Johanssen
Buyer 2: Hilda Johanssen
Buyer 3:
Buyer 4:

Lot: 104     Block: 00
Model: 3305     Sunrise
Elevation: C

Customer will finance using a  Conventional 30 Year Arm
Mortgage for a maximum  0

Base Price:    186,400
Lot Premium:    1,500
Elevation:        800
Total Options: 22,865
Other:              0
Total Price:  211,565

☐ Signed Contract

Extra Info
Edit Detail
Days
Deposits
Print
Cancel
Done

Mkt: Test Market  Comm: Excalibur  Phase: One     Cnprev-0.38     1.62A

FIG. 5D

Sales - [Contract Detail Review and Edit]

People | Lots | Plan | Elev | Options | Scenario | Contr. | Clear | Sub Map | Reports | Chg Sub | Quit
Josef | 104 | Sunrise | C | $22,865 | | | | | | | 211,565

Edit Contract Details for Josef R. and Hilda Johanssen

Lot 104   Block: 00
Model: 3305   Sunrise
Elevation: C

Price Details
              List        Selling
Base Price:   186,400     186,400
Lot Premium:  1,500       1,500
Elevation:    800         800
Options       22,865      22,865
Other         0           0
Total Options: 211,565    211,565

Comments

Special Instructions

Cancel
Done

Mkt: Test Market  Comm: Excalibur  Phase: One          Cndetal-0.34   1.62A

FIG. 5E

Sales - [Contract Options]

| People | Lots | Plan | Elev | Scenario | Options | Contr. | Clear | Reports | Quit |
|--------|------|------|------|----------|---------|--------|-------|---------|------|
| Josef | 104 | Sunrise | C | | $22,865 | | | | |
| | | | | | $211,565 | | Sub Map | Chg Sub | |

Lot 104     Block: 00
Model: 3305 Sunrise
Elevation: C

Modify Options Pricing for Josef R. and Hilda Johanssen

| Option | Qty | Description | List Price | Selling Price |
|--------|-----|-------------|-----------:|--------------:|
| 6006 | 1 | Pool fence | 1,250 | 1,250 |
| 0056 | 1 | Whirlpool Tub | 1,300 | 1,300 |
| 4000 | 1 | Raised Panel Cabinets | 825 | 825 |
| 4010 | 1 | Cabinets in Laundry Room | 275 | 275 |
| 3030 | 1 | 3rd Upgrade Carpet | 1,950 | 1,950 |
| 3034 | 1 | Upgrade Carpet Pad | 275 | 275 |
| 0112 | 1 | WOW Gas Range | 175 | 175 |
| 0081 | 1 | Washer & Gas Dryer | 800 | 800 |
| 7040 | 1 | Overhead lights - Bedrooms | 200 | 200 |
| 9018 | 6 | Additional Phone Jack | 40 | 40 |
| 9050 | 1 | Electric Outlet Package | 125 | 125 |
| 6004 | 1 | 90' Diving Pool | 11,450 | 11,450 |
| 6005 | 1 | Spa package with pool | 4,000 | 4,000 |

Cancel     Done

Mkt: Test Market Comm: Excalibur Phase: One     Cnoption-0.23     1.62A

FIG. 5F

Sales - [Contract Deposits]

| People | Lots | Plan | Elev | Options | Scenario | Contr. | Clear | Reports | Quit |
|---|---|---|---|---|---|---|---|---|---|
| Josef | 104 | Sunrise | C | $22,865 | | | Sub Map | Chg Sub | |
| | | | | | | 211,565 | | | |

Contract Deposit Schedule for Josef R. and Hilda Johanssen

Print

Deposit Schedule

| Description | Received | | Total Scheduled | | |
|---|---|---|---|---|---|
| | Date | Amount | Date | Type | Amount |
| Earnest deposit | 02/11/1995 | 5,000 | 02/11/1995 | | 0 |

Cancel

Deposit Amounts

| Earnest | Chng Orders | Other |
|---|---|---|
| 5,000 | 0 | 0 |

Add New Line    Delete this Line    Done

Mkt: Test Market  Comm: Excalibur  Phase: One    Cndep-0.32    1.62A

FIG. 5G

Sales - [Contract Processing]

| People | Lots | Plan | Elev | Options | | Scenario | Contr. | Clear | Reports | Quit |
|--------|------|------|------|---------|--|----------|--------|-------|---------|------|
| Josef | 104 | Sunrise | C | $22,865 | 211,565 | | Approved | | Sub Map | Chg Sub |

| Contact Name | Lot | Blk | Phase | Plan | Stat |
|---|---|---|---|---|---|
| Josef R. and Hilda Johanssen | 104 | 00 | One | Sunrise | Approved |
| Spec Home | 88 | 00 | One | Sunrise | Approved |

- Modify Contract
- Create Contract
- Change Orders
- Cancel Contract
- Mortgage Transfer
- Reprint Contract Contract Comments Save Done Mkt: Test Market  Comm: Excalibur  Phase: One | Cntract-0.53 | 1.62A

FIG. 5H

Sales - [Change-Orders]

People | Lots | Plan | Elev | Options | Scenario | Contr. | Clear | Sub Map | Reports | Chg Sub | Quit
Josef | 104 | Sunrise | C | $22,865 | | | | | | | 
 | | | | $211,565 | | Approved | | | | |

Changes | Change #1 | Std. Options | Other | Elevation | Current House

Contact Name: Josef R. and Hilda Johanssen — Status: Pending

Lot: 104   Block: 00
Model: 3305   Sunrise
Elevation: C
Salesperson:

Current Contract
Base Price:        186,400
Elevation:             800
Lot Premium:       1,500
Options:            20,865
                   ———————
Total:             209,565
Deposits:                0

All Changes Orders

| CO# | Created | Lines | Status | Price | Loan |
|---|---|---|---|---|---|
| 0 | 06/07/1994 | 16 | Approved | 208,065 | 0 |
| 1 | 02/11/1995 | 0 | Pending | 0 | 0 |

Sub Total:                    208,065
Lot Premium:                    1,500
Total Approved and Pending:   209,565

Selected Change - Information
☐ Signed Change Order
[0] Cash Required
[0] Change Order Fee
    Deposit Due                0
[1] Copies to Print Add
Deposits
Print
Save
Cancel
Done Mkt: Test Market  Comm: Excalibur  Phase: One | CnChange-0.16 | 1.62A

Sales - [Change-Orders]

| People | Lots | Plan | Elev | Options | | Scenario | | Contr. | Clear | Reports | | Quit |
|--------|------|------|------|---------|--|----------|--|--------|-------|---------|--|------|
| Josef | 104 | Sunrise | C | $22,865 | | | 211,565 | | | | | |

Changes | Change #0 | Std. Options | Approved | Sub Map | Chg Sub

Contract Name: Josef R. and Hilda Johanssen | Other | Elevation | Status: Approved | Current House Selected Model: 3305  Sunrise

| Option | Qty | Description | Price | Date |
|--------|-----|-------------|-------|------|
| 3030 | 1 | 3rd Upgrade Carpet | 1,950 | 06/07/1994 |
| 6004 | 1 | 90' Diving Pool | 11,450 | 06/07/1994 |
| 9018 | 6 | Additional Phone Jack | 40 | 06/07/1994 |
| 4010 | 1 | Cabinets in Laundry Room | 275 | 06/07/1994 |
| 0001 | 1 | Discount | -2,000 | 06/07/1994 |
| 9050 | 1 | Electrical Outlet Package | 125 | 06/07/1994 |
| 7040 | 1 | Overhead lights - Bedrooms | 200 | 06/07/1994 |
| 6006 | 1 | Pool fence | 1,250 | 06/07/1994 |
| 4000 | 1 | Raised Panel Cabinets | 825 | 06/07/1994 |
| 6005 | 1 | Spa Package with pool | 4,000 | 06/07/1994 |
| C | 1 | Sunrise, Elevation C | 800 | 06/07/1994 |
| 3034 | 1 | Upgrade Carpet Pad | 275 | 06/07/1994 |
| 0081 | 1 | Washer & Gas Dryer | 800 | 06/07/1994 |

Sort:
○ Date
○ Option
◉ Desc.

Deposits | Print | Save | Cancel

Mkt: Test Market  Comm: Excalibur  Phase: One | CnChange-0.16 | 1.62A

SO = SALES OFFICE
MO = MARKET OFFICE
RO = REGIONAL OFFICE
CO = CORPORATE OFFICE

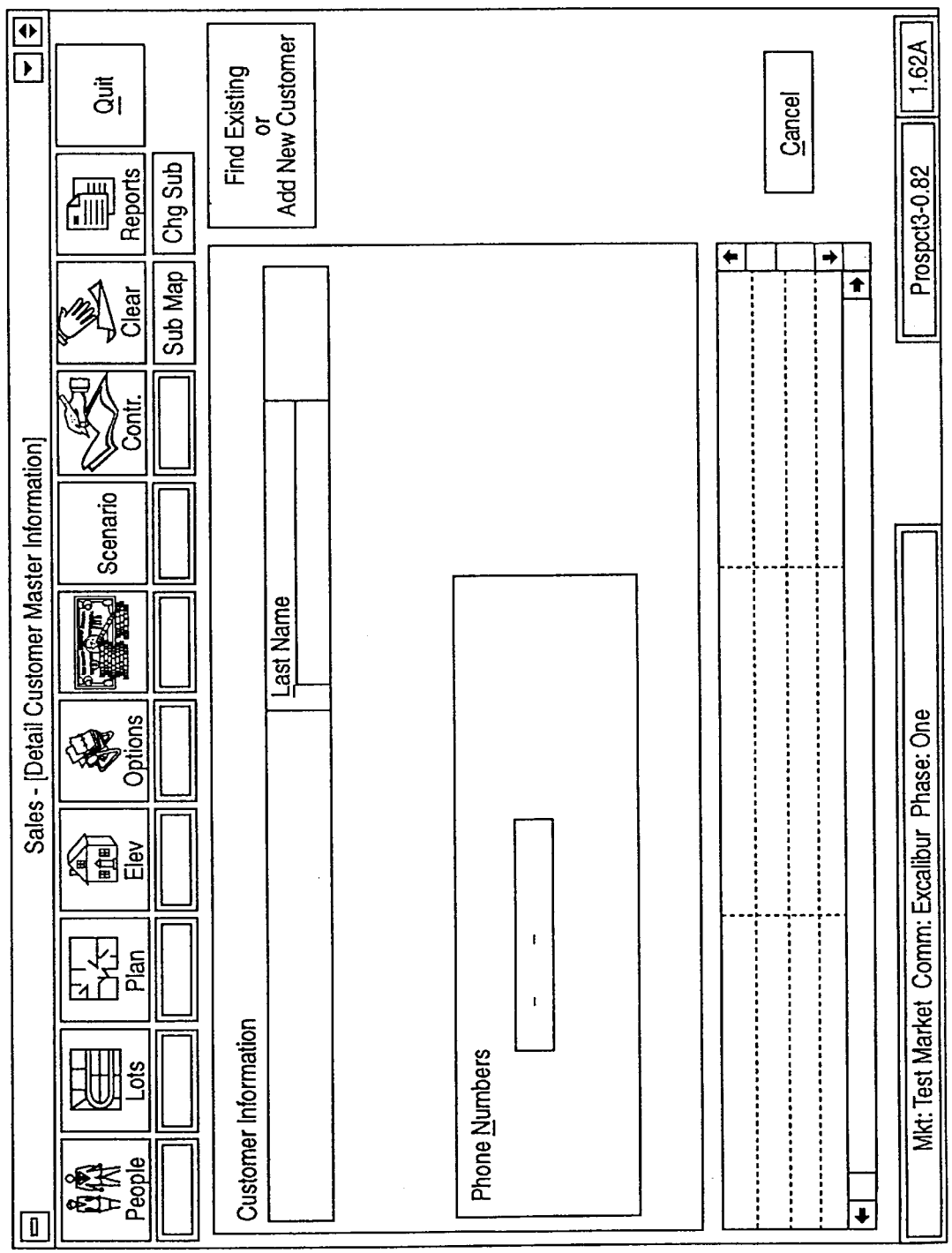

FIG. 8B

Sales - [Detail Customer Master Information]

People | Lots | Plan | Elev | Options | Scenario | Contr. | Clear | Reports | Quit
Sub Map | Chg Sub Find Existing
or
Add New Customer Customer Information Last Name Press 'ENTER' to add this
person as a new customer.

Phone Numbers

| Jackson, Richard Allen | 1509 Cresent Lane | Matthews | TST |
| Johanssen, Josef R. & Hilda [2] | 1234 North Ridge Road | Southfield | TST |
| Jones, John J. | 12 Main St. | Troy | TST |

Cancel

Mkt: Test Market Comm: Excalibur Phase: One | Prospct3-0.82 | 1.62A

Sales - [Customer Financial Information]

| People | Lots | Plan | Elev | Options | Scenario | Contr. | Clear | Sub Map | Reports | Chg Sub | Quit |

Josef:

Josef Johanssen    Hilda Johanssen

Social Security Number: [ - - ]   [ - - ]

Income Details  Income: 100000   3600

○ Hourly  ● Monthly     ○ Hourly  ● Monthly
 ○ Weekly  ○ Annually    ○ Weekly  ○ Annually
 ○ Bi-Weekly             ○ Bi-Weekly Equiv. Annual Gross Amt: 1,200,000 + 43,200 = 1,243,200  ● Gross
Other:                          0 +      0 =         0  ○ Net
Total Income:            1,200,000 + 43,200 = 1,243,200

Monthly Non Housing Dept: 600 + 0 = 600
Available Cash:        65,000 + 0 = 65,000

Current Housing Information
Housing Payment:         750 + 0 = 750
Mortgage Balance:     29,000 + 0 = 29,000
House Value:          89,000 + 0 = 89,000

Cancel

OK

Mkt: Test Market  Comm: Excalibur  Phase: One    Prospct6-0.27   1.62A

Market Administration [Contract Processing]

Mkt Master | Financing | Set Subdiv. | Lots | Contr. Aprvl | Reports | Change Location | Quit Contract/Change Order Approval Contracts for Approval

| Name | Lot | Blk | Community | Phase | Plan | Contr. | Diff. | Con. | Depos. |
|---|---|---|---|---|---|---|---|---|---|
| James E. Wright III | 114 | 00 | Excalibur | One | Lexington | 100,900 | | | 1,000 |
| Jason P. Cooper | 98 | 00 | Excalibur | One | Lexington | 103,250 | | | 0 |
| James A. and Mary T. | 96 | 00 | Excalibur | One | Lexington | 103,835 | | | 0 |
| Richard Allen Jackson | 94 | 00 | Excalibur | One | Sunrise | 201,000 | | | 0 |
| Vicki Lynn Shephard | 90 | 00 | Excalibur | One | Avalon | 102,390 | | | 0 |

Contracts for Approval
Display  Resize  Approval
Count 5

Change Order for Approval
Display  Resize  Approval
None

Done

Mkt: Test Market  Comm: Excalibur  Phase: One     Cnatract-0.35    1.62

SYSTEM FOR FACILITATING HOME CONSTRUCTION AND SALES

This is a divisional of application Ser. No. 08/387,541 filed on Feb. 13, 1995, now U.S. Pat. No. 5,689,705.

TECHNICAL FIELD

This invention relates to a system for facilitating home construction and sales and more particularly relates to a computer implemented system for assisting new home purchasers, sales associates, and home construction companies to efficiently manage the information flow which is present before, during, and after new home construction and sales.

BACKGROUND OF THE INVENTION

It is customary for prospective new home purchasers to meet with a salesperson (usually an agent of a construction company) and to review various home designs that the construction company offers. During this process, financial information may be obtained from the prospective buyer in order to determine "how much home" they can afford. If the prospective buyer is interested in a particular subdivision, the sales persons must access various records to determine the status of the various lots in the subdivision to determine which lots are available, what their cost is and other information which may be relevant to the decision making process of the potential purchaser.

It can be easily seen that the information which the sales associate must access in answering some basic questions that a single potential purchaser may have can become cumbersome—even at the initial stages of a potential purchaser's inquiries. It can also be easily seen that once a purchaser enters into a purchase agreement with the home construction company, much information must be tracked such as the status of the home construction, mortgage approval status, selected options to the home, and various change orders, etc. In view of the above, it is easy to see how the management of information associated with the construction and sale of a single home can be daunting. However, when a construction company must deal with multiple subdivision projects which are disbursed across multiple, geographically remote sites, the management of information associated with each of the construction projects is a monumental undertaking if done using conventional, manual techniques.

In view of the above, it is an object of this invention to provide a computer based system for managing the information flow associated with new home construction and new home sales. This object is accomplished by providing the salesperson with various software modules which facilitate information flow between the purchaser/potential purchaser and the sales associate. Also, the present invention sets forth a software system for coordinating information flow between sales sites and a more centralized site where information can be collected and acted upon. Thus, the present invention not only facilitates information flow at the sales office level, but facilitates information flow between various sales offices and various remote locations.

SUMMARY OF THE INVENTION

In a first aspect, the present invention discloses a system for displaying plat status information to a viewer including the steps of displaying, on a video display terminal, a plurality of polygons, each polygon representing a respectively associated plat; selecting a status associated with each plat; and coding each polygon with a visible indicia indicative of the status assigned to each polygon.

In a second aspect, the present invention discloses a system for displaying plat status information comprising; computer means including a video display terminal for displaying a plurality of polygons, each polygon representing a plat; means for coding each of the polygons with an invisible indicia indicative of the status assigned to each of the polygon's respectively associated plat.

Still in another aspect, the present invention discloses a method of communicating between first and second geographically remote data bases, comprising the steps of: receiving information relating to the construction or sale of homes into the first data base; separating the information into a plurality of first data base records; determining which of the plurality of first data base records have been altered from a previous state; sending the altered records of the first data base to the second data base; matching each altered data base record sent from the first data base with a respectively associated record of the second data base; and amending each match record of said second data base to reflect the information present in the respectively associated altered record send from the first data base.

Yet in another aspect, the present invention discloses a system for facilitating tracking-information associated with selling and constructing homes including, computer means; means coupled with the computer means for displaying plat information relating to the homes; means coupled with the computer means for displaying information relating to the design of the homes; means coupled with the computer means for displaying information related to the options associated with the homes; means, coupled with the computer means, for displaying mortgage information relating to the purchase of the home; and means, coupled with the computer means for displaying information related to a contract associated with the sale of the home.

BRIEF DESCRIPTION OF THE DRAWINGS

FIGS. 2A–2E depict the operation of the PLAN SECTION module of the present invention.

FIGS. 3A–3C depict the operation of the OPTIONS MODULE of the present invention.

FIGS. 4A–4E depict the operation of the FINANCE MODULE of the present invention.

FIGS. 5A–5J depict the operation of the CONTRACT MODULE of the present invention.

FIGS. 8A–8F depict the PEOPLE INFORMATION MODULE of the present invention.

FIGS. 9A–9D depict the ADMINISTRATION SYSTEM of the present invention.

DETAILED DESCRIPTION OF THE PREFERRED EMBODIMENTS

The above referenced modules are set out and discussed in detail below.

Lot Information Module

Figure 1A:
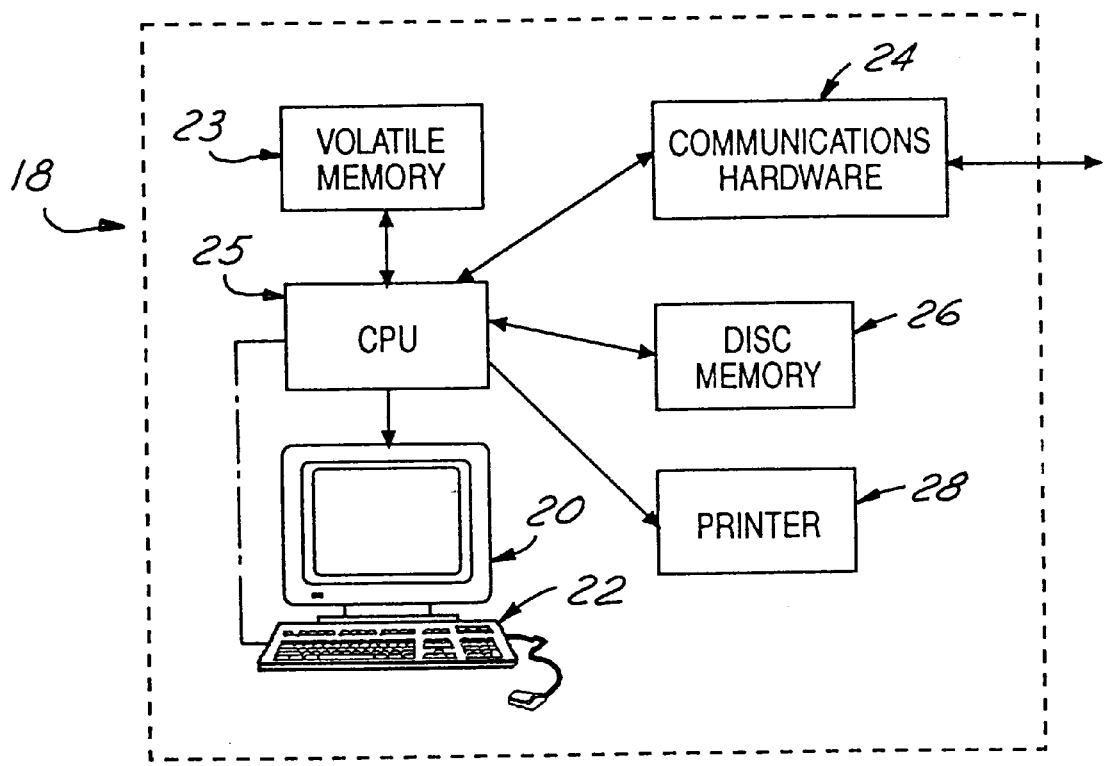
FIGS. 1A–1J depict the operation of the LOT INFORMATION MODULE of the present invention.

The LOT INFORMATION MODULE of the present invention is adapted to be run on any computer system but is particularly adapted for use on a personal computer. A preferred hardware arrangement for such a personal computer 18 is depicted in FIG. 1A wherein such standard components as CPU 25 coordinates the operation of CRT 20, keyboard 22, volatile memory 23, communications hardware 24, disk memory 26, and printer 28. The modules of the present invention are currently running on an IBM PC Compatible Pentium (DELL OPTIPLEX), 90 mega hertz, 16 mega bytes RAM, local bus video with S3 video drivers, 500 mega bytes IDE hard disk drive, INTERNAL 14.4 kilo bytes asynchronous modem, 15 inch SVGA video display terminal, standard keyboard, mouse with Microsoft DOS 6.2, and Windows for workgroups version 3.11.

Of course, many other personal computers will perform equally as well such as a Compaq™, IBM Value Point™, Dell™, NEC™, etc.

The LOT MODULE is selected by positioning an indicator on the LOTS icon 30 and then activating the selection. This positioning/activation sequence is typically implemented by way of a "mouse" control, but any other technique for allowing a user to select from a menu of options is also contemplated including finger selection.

Figure 1B:
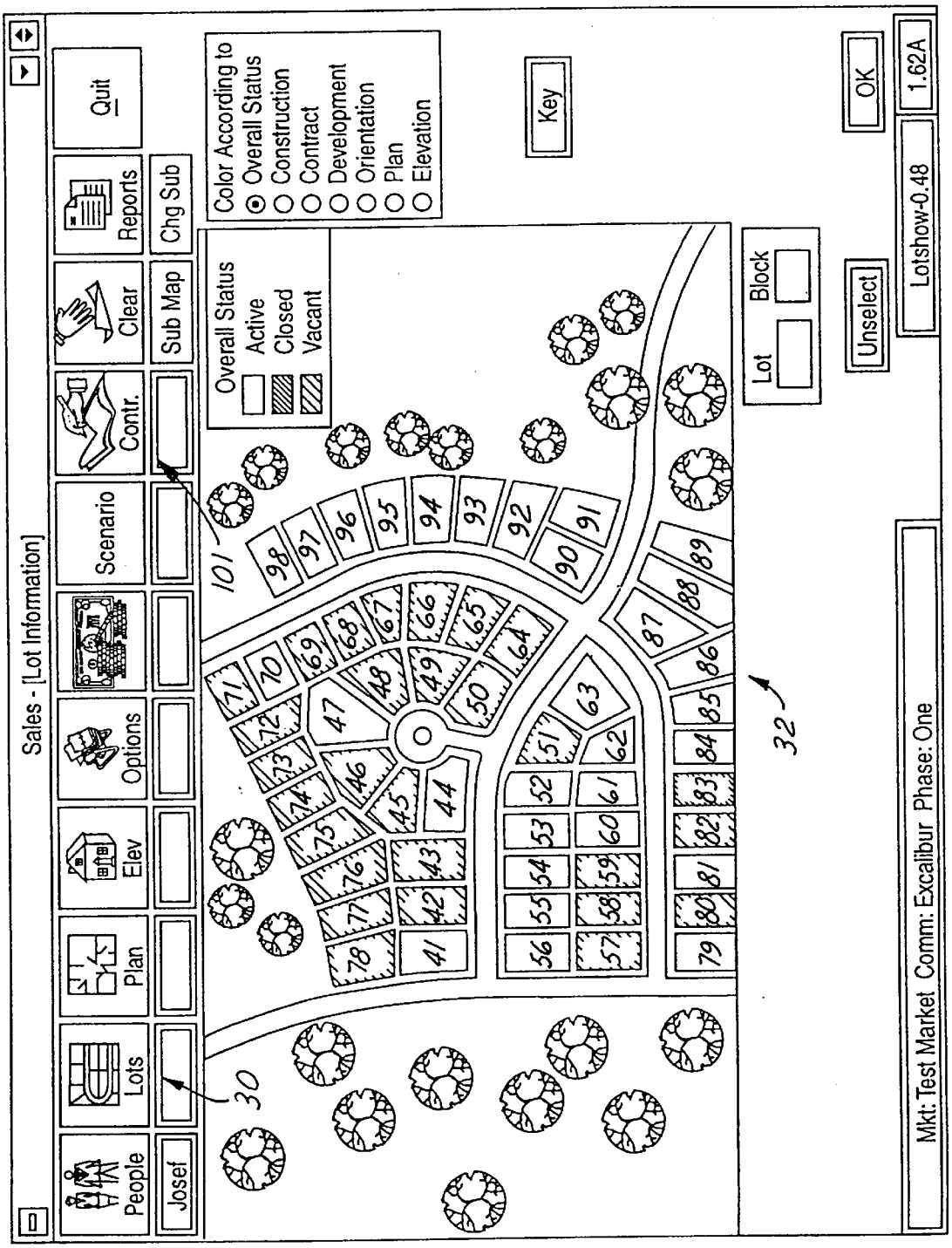

Once the LOTS selection is activated, a simulated aerial view of the particular subdivision is displayed. In the example of FIG. 1B, the Excalibur subdivision is depicted comprising a total of 58 plats, each separate plat defined by a respectively associated polygon 41 through 98.

One option within the LOTS MODULE is the OVERALL STATUS option. By selecting the OVERALL STATUS option, each plat 41 through 98 is assigned one of three visual codes—active code, closed code, or vacant code. These visual codes associated with each polygon can be a design (such as cross hatching or stimpling) associated with each polygon, or perhaps even simpler, a predetermined color can be associated with each code. Thus, by viewing the colors associated with each polygon, a perspective buyer can immediately determine which of the plats (or lots) are not yet sold (i.e. vacant), which of the plats are sold and construction is completed (i.e. closed), and which of the plats are sold and construction is underway but not yet completed (i.e. active).

Figure 1C:
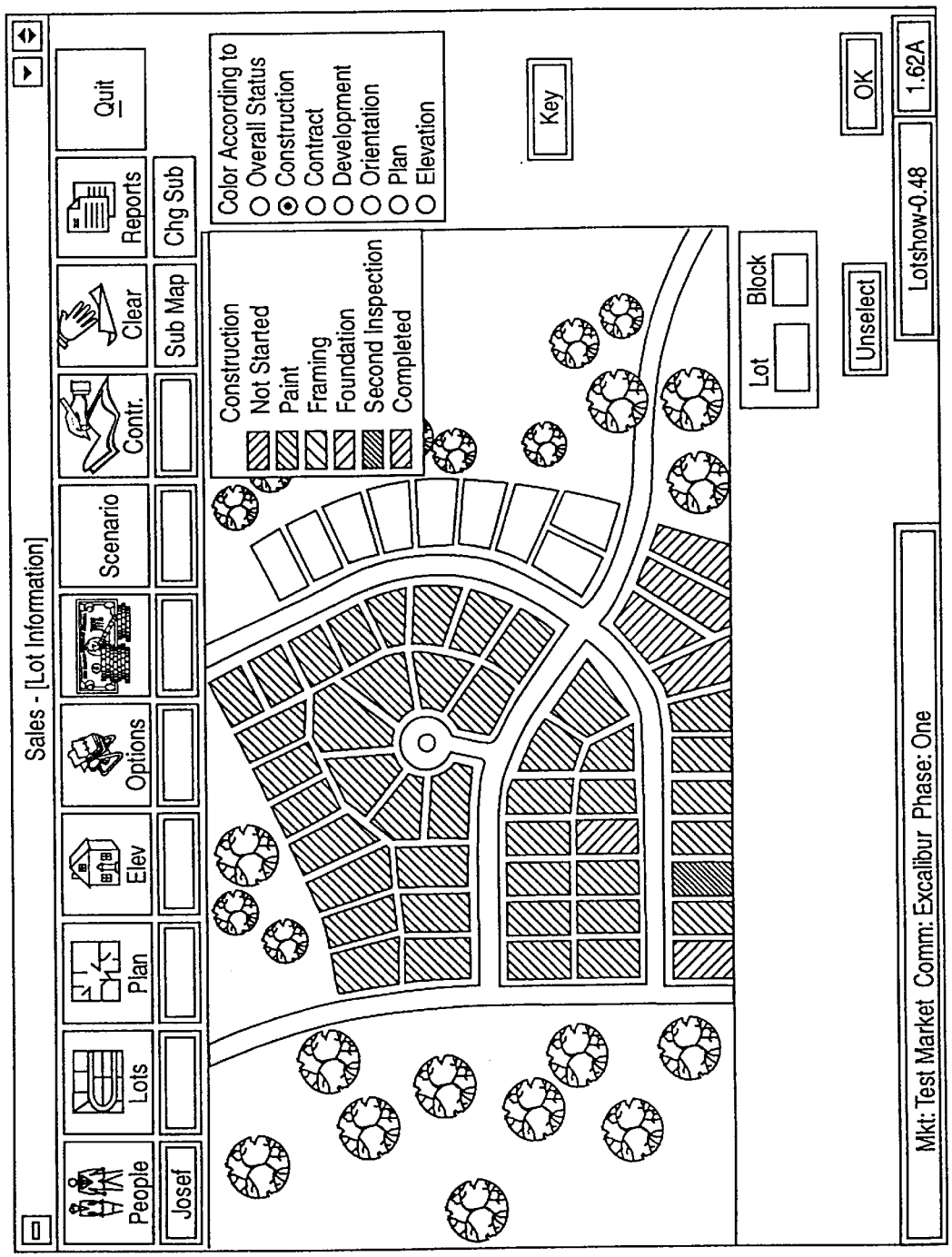

A second option available in the LOTS MODULE is the CONSTRUCTION option. If this option is selected, the viewer is presented with the display set forth in FIG. 1C wherein the status of the construction for each LOT is displayed. Again, each construction status is reflected in a code associated with each of the LOTS. As was mentioned before, this code can be a color, simulated texture, or any such indication which is visually detectable. The various statuses associated with the construction option range from construction not started at all to construction completed and are defined in a separate lot administration module.

Figure 1D:
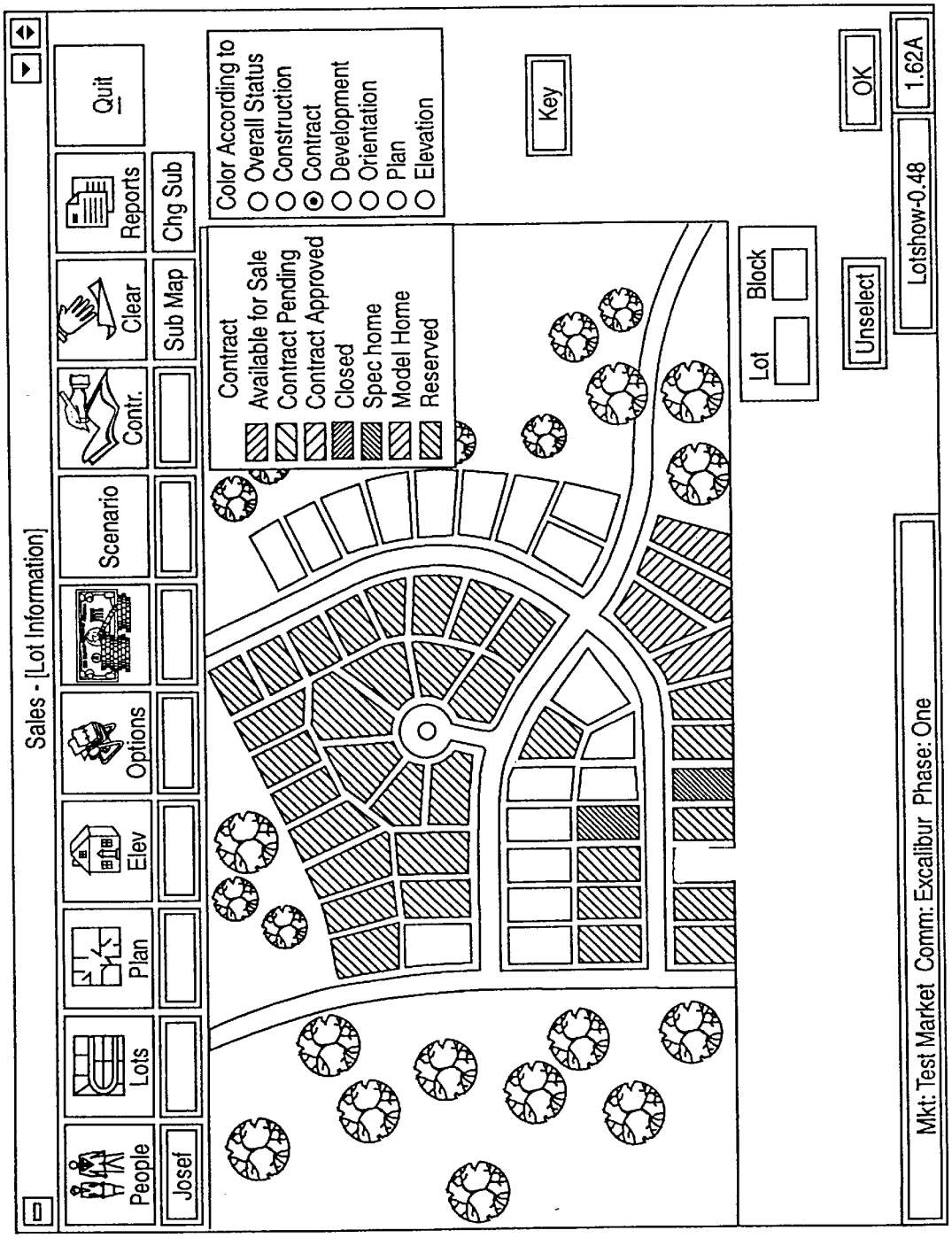
Figure 1E:
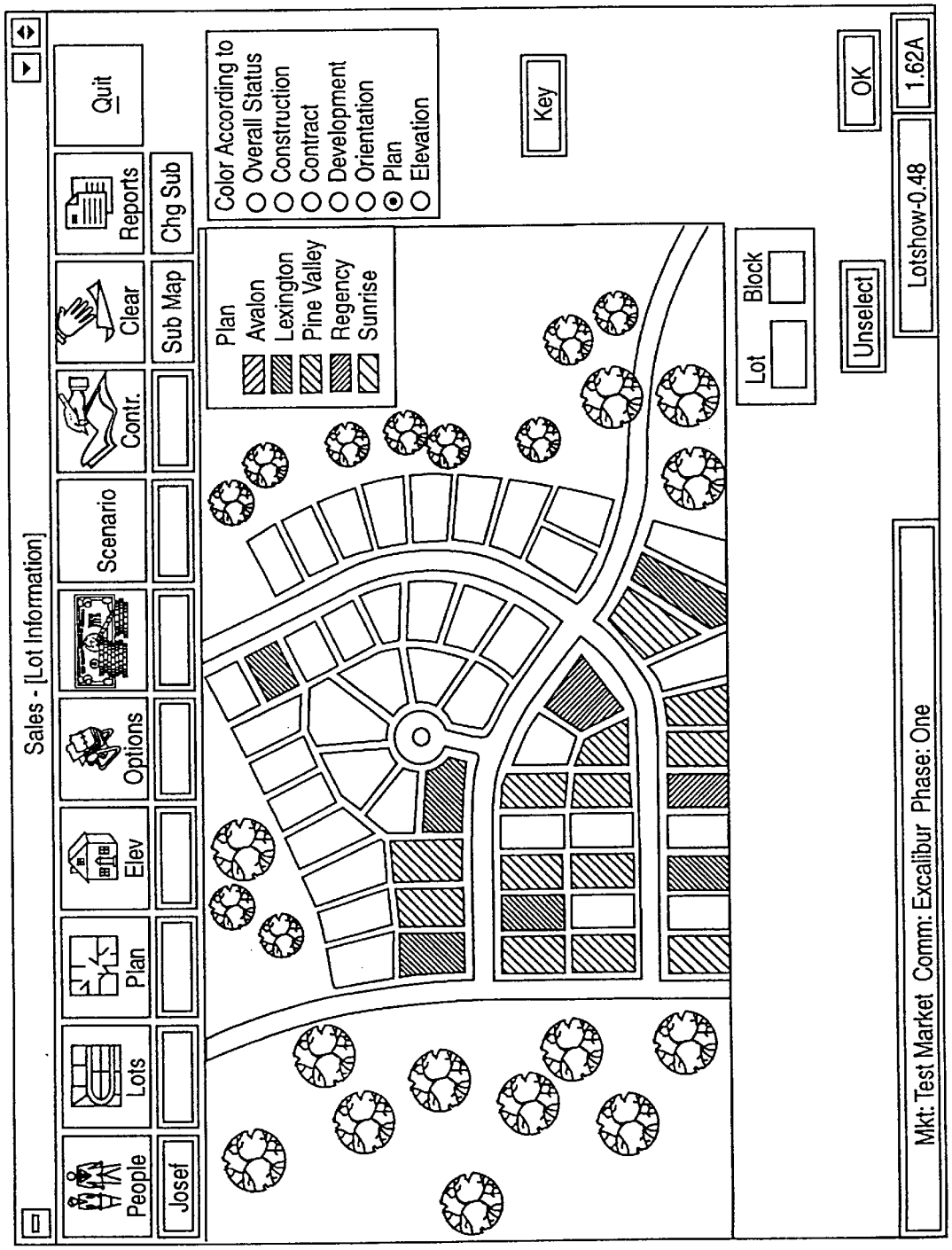
Figure 1F:
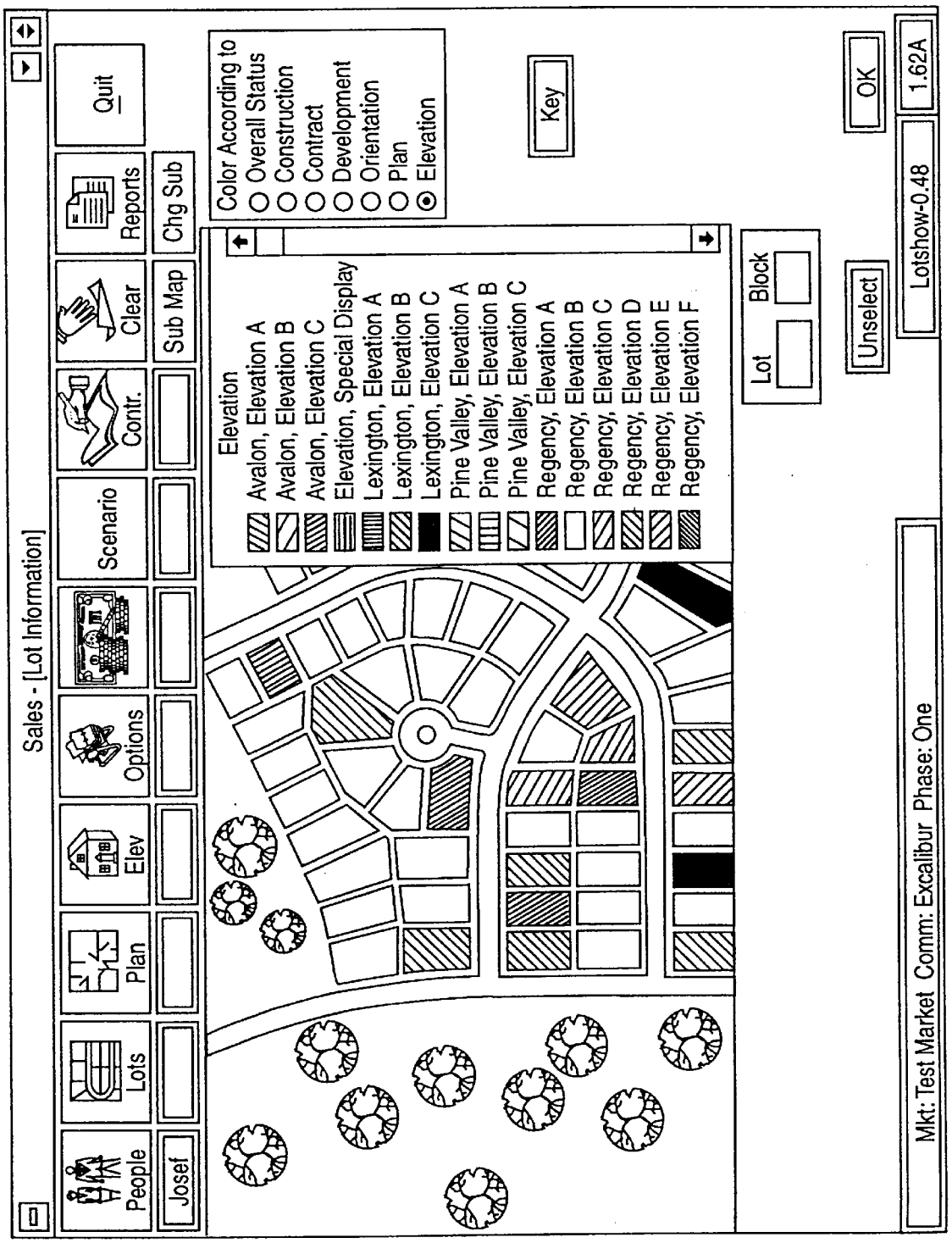

A third option available within the LOTS MODULE is the CONTRACT option. If this option is selected, the display depicted in FIG. 1D is presented to the viewer wherein various CONTRACT statuses are associated with each LOT. Each status has associated therewith a visually detectable data as has already been discussed in conjunction with the CONSTRUCTION option and the OVERALL STATUS option. Thus, by exercising the CONTRACT option, the viewer can immediately determine the status of the CONTRACTS associated with each of the LOTS in the Excalibur SUBDIVISION. Other options exist to display the lot information based on the floor plan, garage oriented elevation, roof color, brick color, etc., is shown on FIGS. 1E and 1F.

Figure 1G:
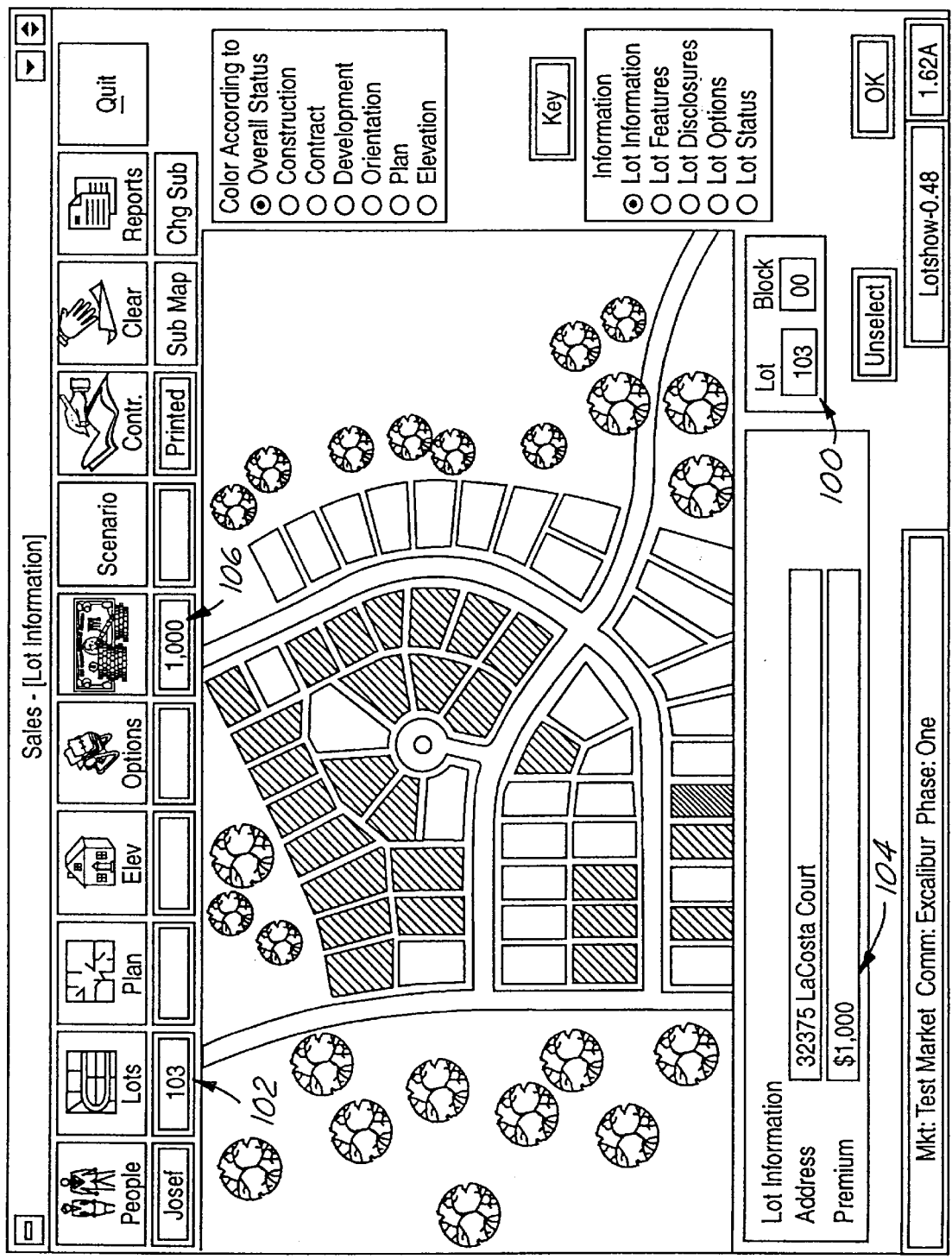

If the viewer wishes to access LOT information associated with a particular LOT, a pointer (not shown) is manipulated proximate the LOT of interest, and the pointer is activated. This causes the LOT information associated with that selected LOT to be displayed (as shown in FIG. 1G). LOT information may consist of the postal address associated with the LOT, any premium associated with the purchase of that LOT, the LOT and block number, etc. Also displayed is the cumulative, total cost of the home 106. Thus, as various options are elected/cancelled, the purchaser is instantly apprised of the cost impact of his decisions.

Figure 1H:
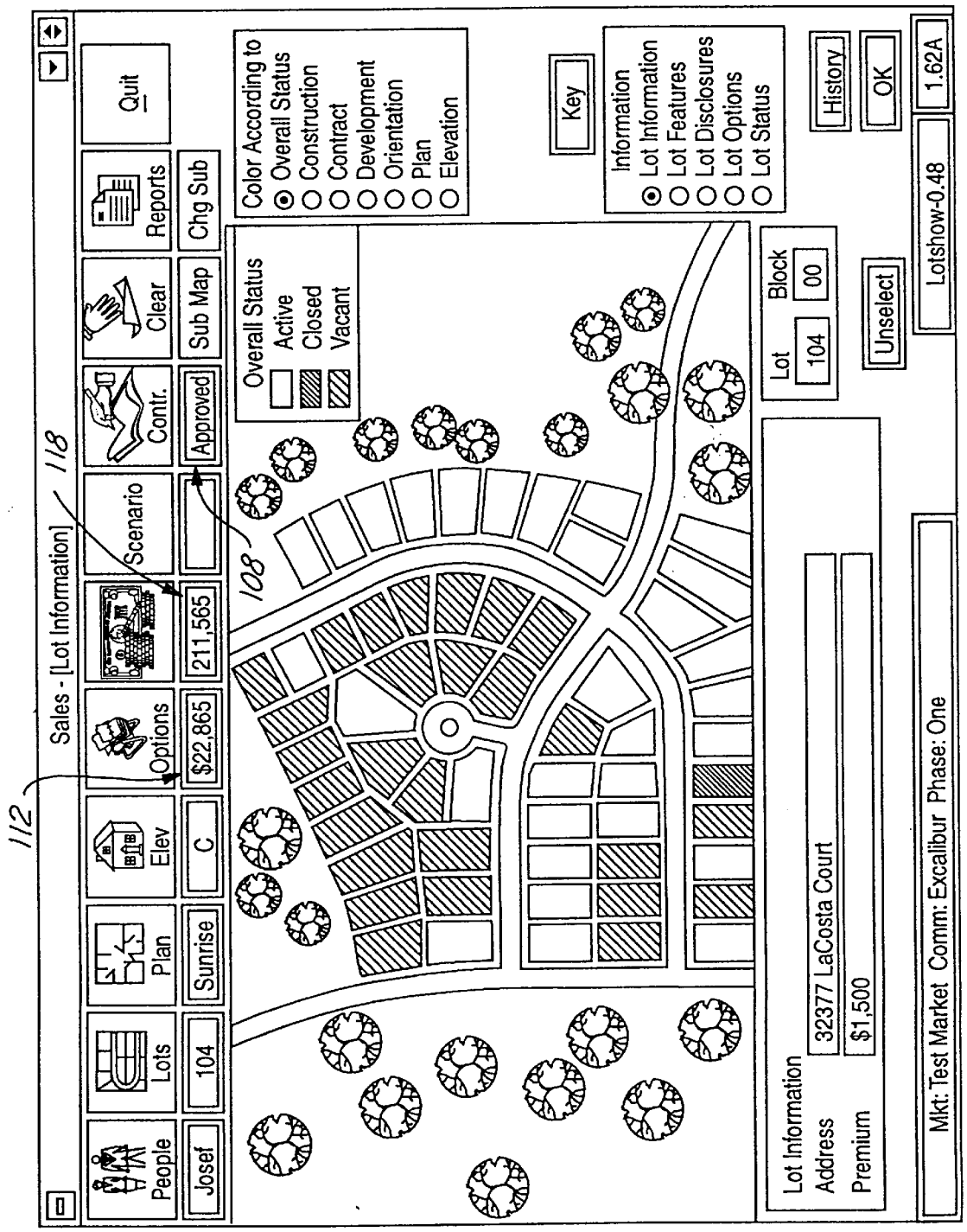

In FIG. 1H, a LOT information inquiry has been done wherein the LOT inquired of (LOT 104) has a CONTRACT status of APPROVED 108, has been sold for $211,565.00 (see reference #110) and has $22,865.00 worth of options 112.

Figure 1I:
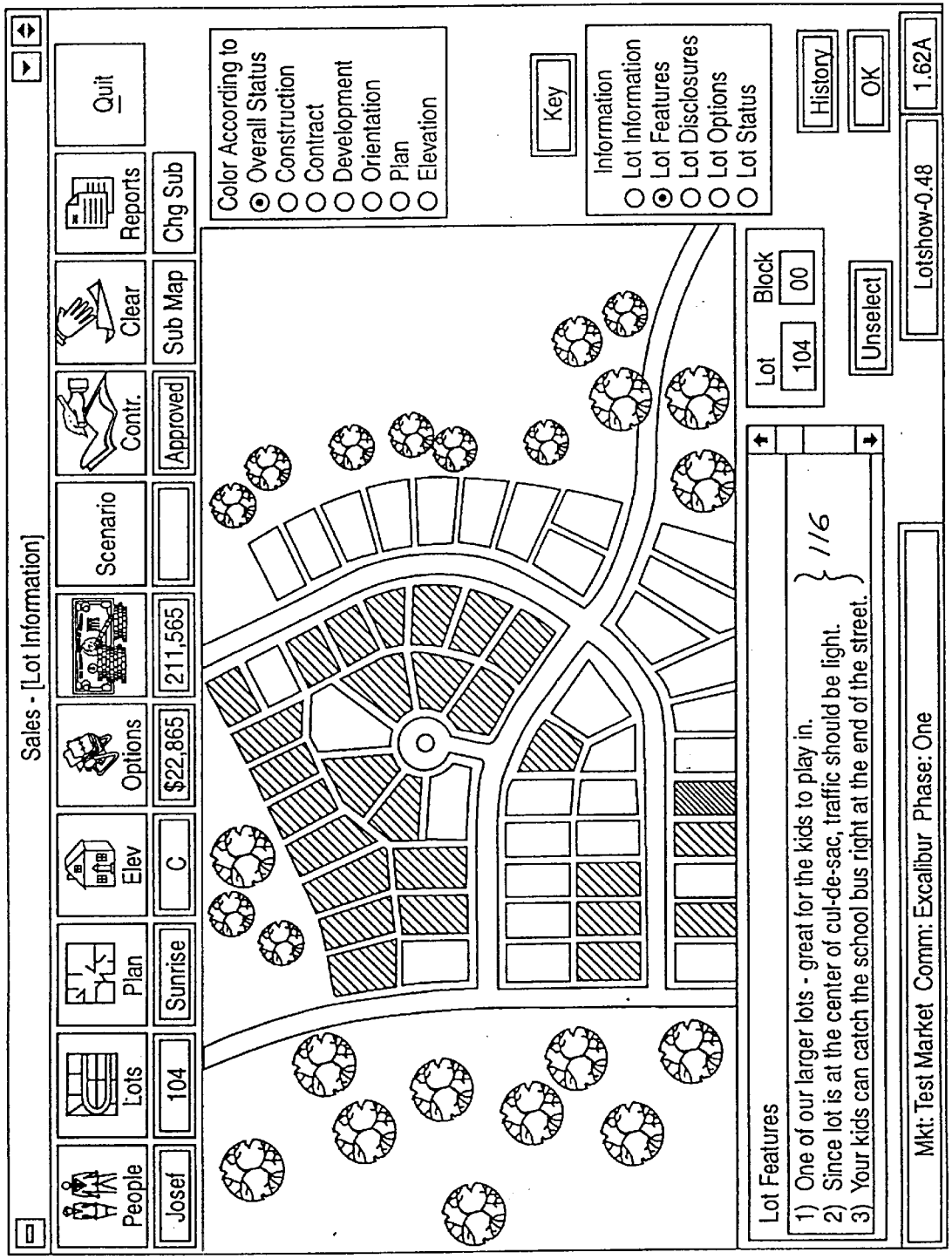

FIG. 1I shows the display of selected information when the LOT FEATURES 114 option is selected by the operator. When this option is selected, various selling features 116 associated with the particular LOT at issue are conveyed to the viewer.

Figure 1J:
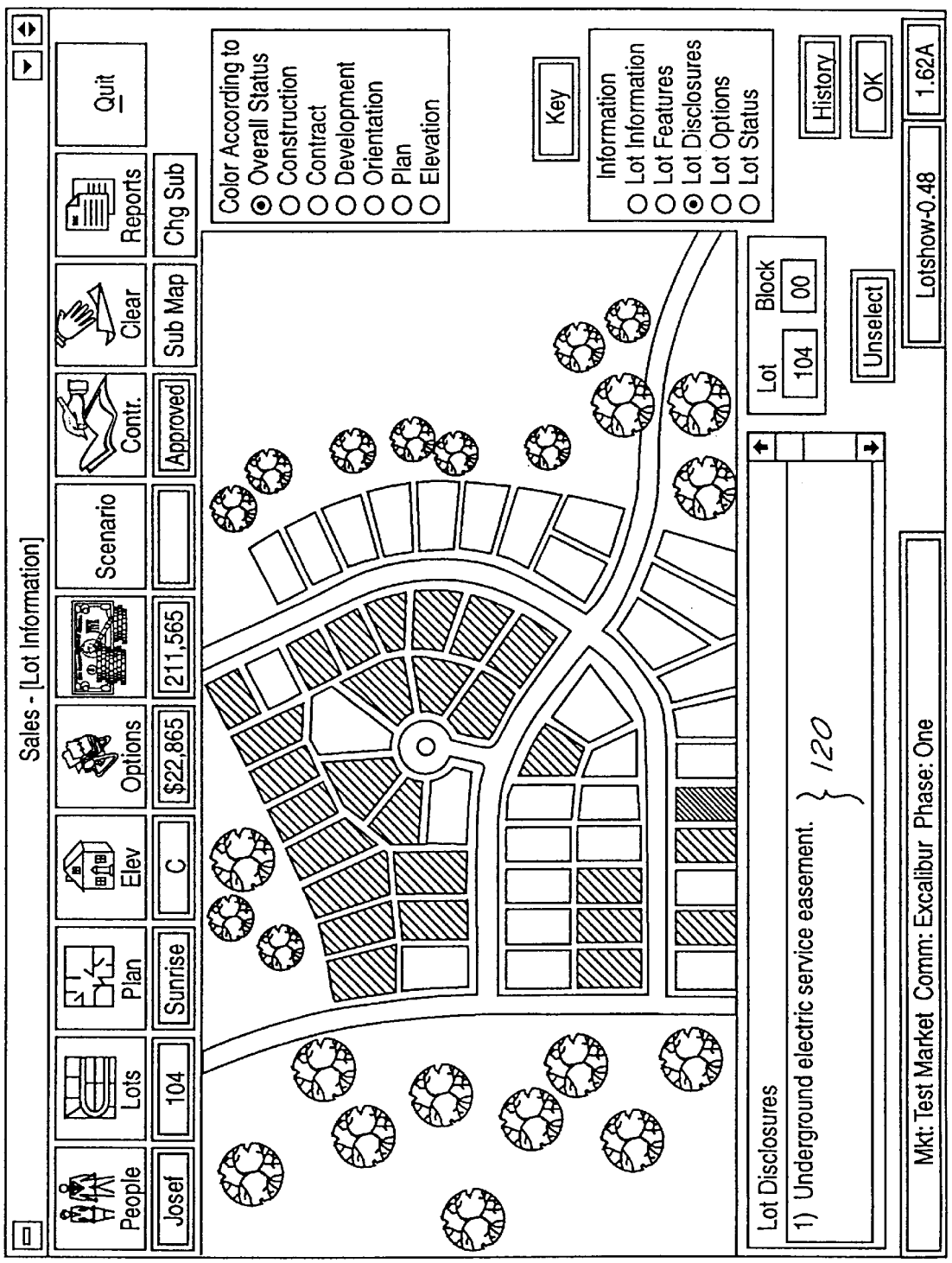

FIG. 1J illustrates the type of information which is displayed when the LOT DISCLOSURES 118 option is selected by the viewer. When the LOT DISCLOSURES 118 option is selected by the viewer, the various easements, encumbrances, or the like associated with the selected LOT are conveyed to the viewer.

In the preferred implementation of the LOT INFORMATION MODULE of the present invention, the software associated with the LOT INFORMATION MODULE reads an AutoCAD™ DXF file that contains the LOT INFORMATION. The data is preferably scaled to best display the information on the computer screen keeping the same x and y coordinate proportions. The AutoCAD file is parsed and a "lot coordinate" file is created that contains the normalized data values for each LOT with all points for a particular LOT grouped together. Using Microsoft™ Window API calls, the entire plat map is generated by drawing one LOT in its entirety and then drawing the next LOT in its entirety, etc. until all LOTS have been drawn. By utilizing this technique, a simple polygon for each LOT is created which permits the user to later select the LOT by simply pointing to the LOT with their finger or selecting the LOT with a visual pointing device (such as a mouse, etc.). In addition, since the scaling information has been predetermined from the AutoCAD file, a second (or subsequent) image may be superimposed on the LOT map to add background information such as trees, lakes, streams, roads, etc.

Because the polygon is a defined region within Windows, the LOTS can be easily changed and colored to represent different "states" (or statuses) in construction or any other processes associated with the plat.

Plan Selection Module

Figure 2C:
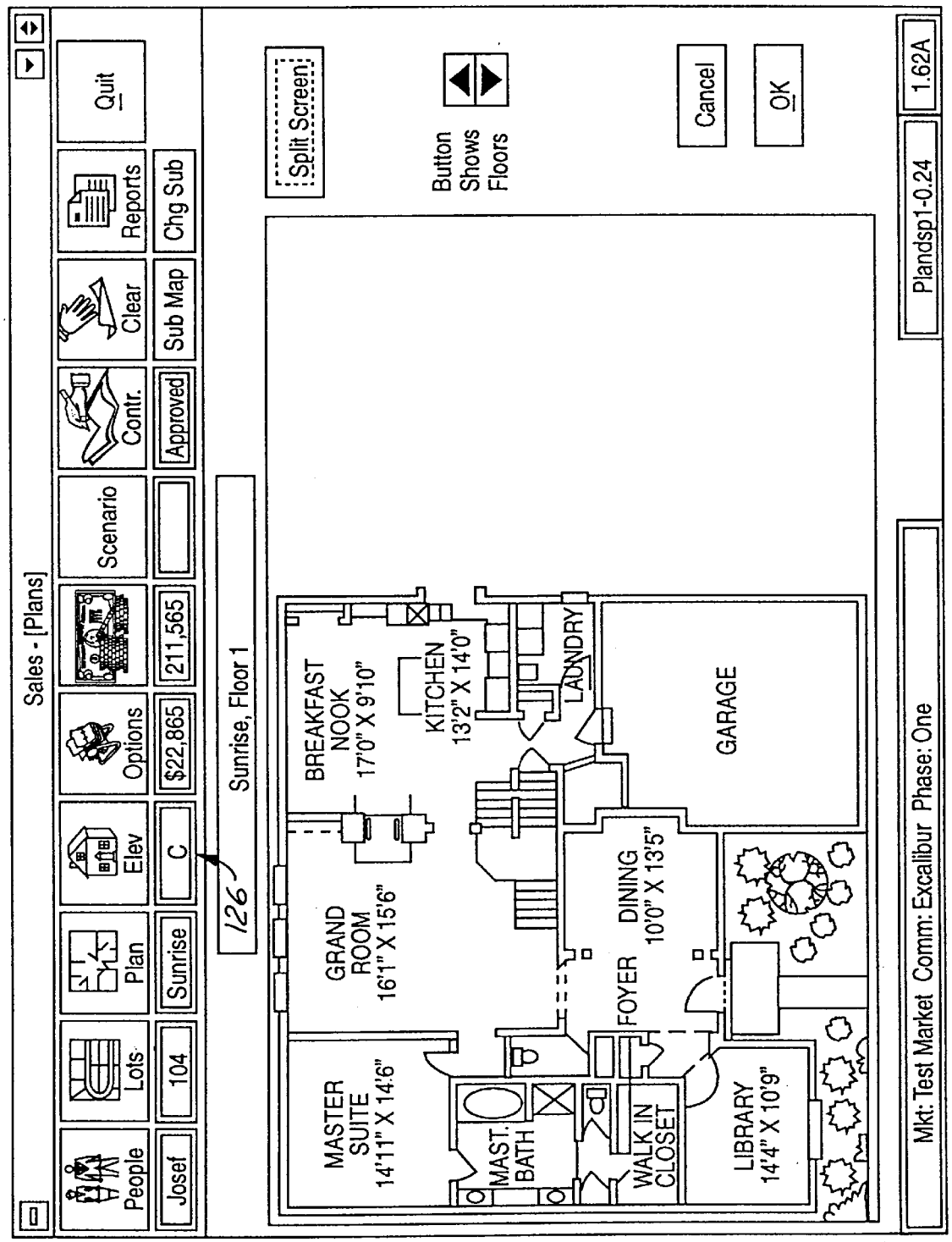

The PLAN SELECTION MODULE allows the viewer to see floor plan layouts and elevational views for each of the model home designs made available by the builder. When the user selects the PLAN SELECTION MODULE, the display set forth in FIG. 2A will appear on video display device 20. This screen sets forth the basic designs from which the buyer may select from and sets forth some of the features associated with each design. If the viewer wishes to see the room layout associated with a particular design, the user simply selects one of the designs (in a manner already discussed in conjunction with selecting modules) and activates the SHOW PLANS 122 BUTTON. In response to this selection, the screen of FIG. 2B will be displayed wherein the design of the SUNRISE floor plan is displayed. If the viewer wishes to view an aspect of the floor plan with great resolution, the enlarged 124 option may be selected which, in turn, will give rise to the screen display set forth in FIG. 2C.

Figure 2D:
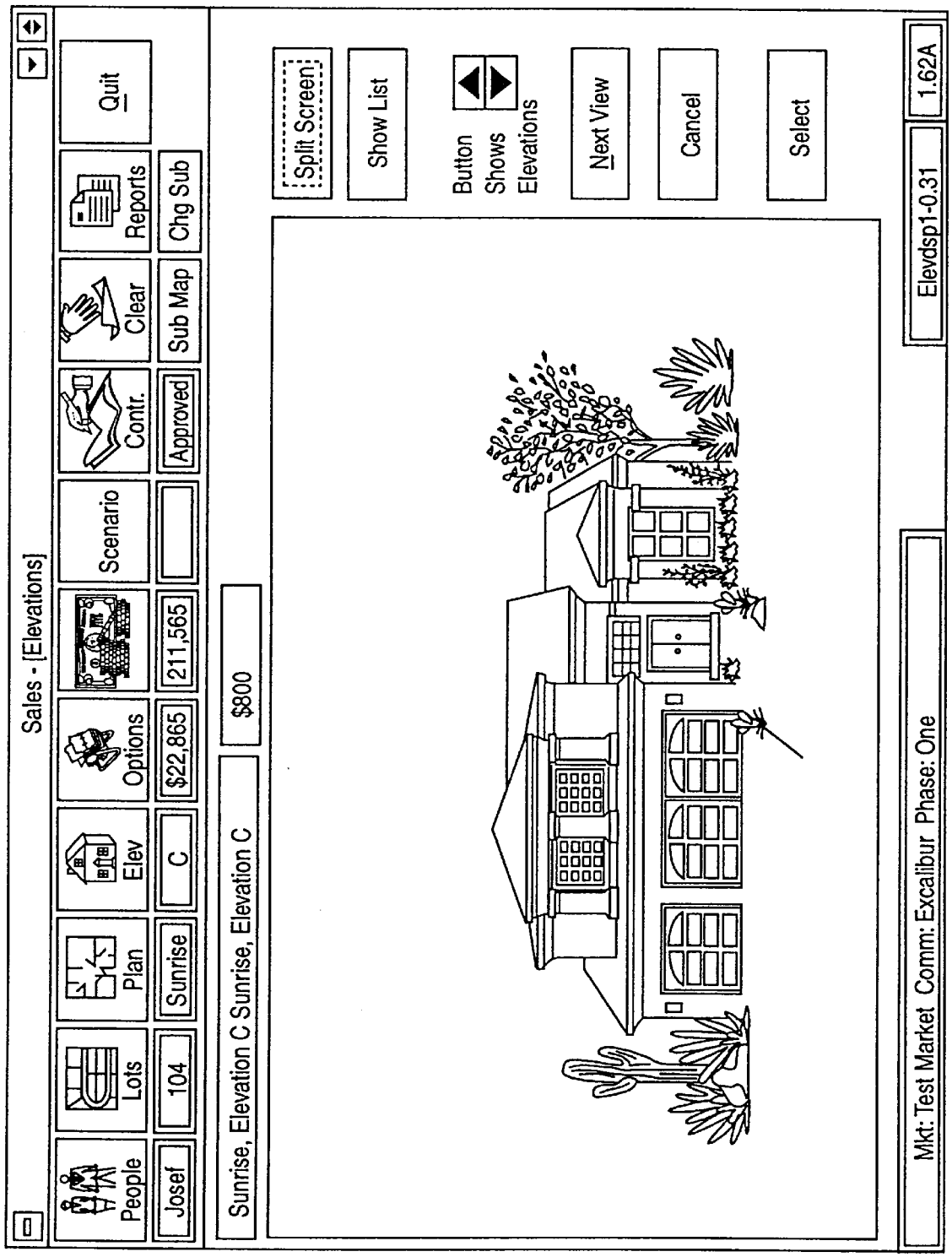
Figure 2E:
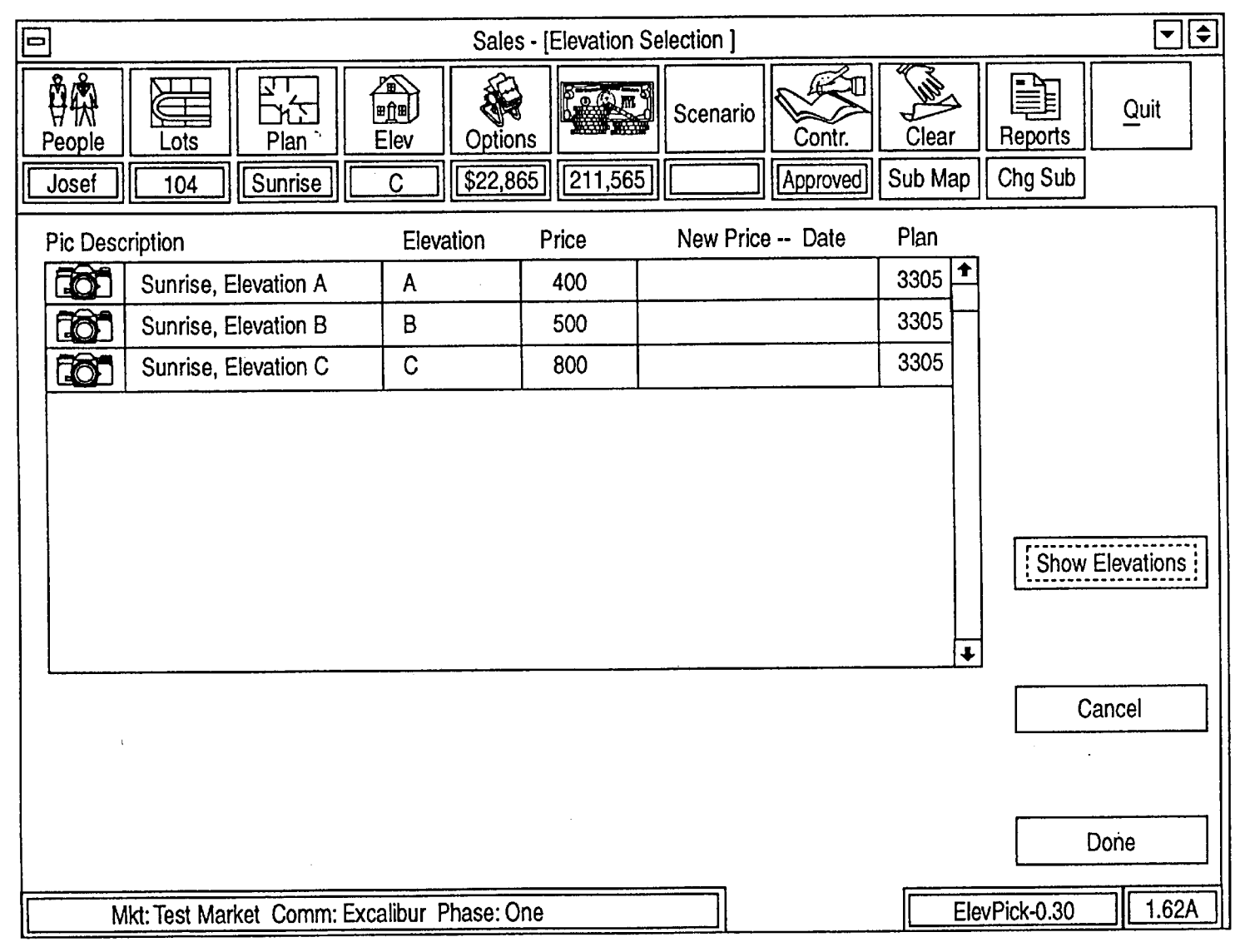

If the user wishes to see the front elevational depiction of the SUNRISE DESIGN, the elevation option 126 is selected which gives rise to the displays depicted in FIG. 2D. Other elevations are available to view by simply making the appropriate selection as evidenced by the menu options set forth in FIG. 2E.

Thus, the PLAN SELECTION MODULE allows a potential buyer to review the floor plan layouts and the elevational layouts of any number of home designs offered by the contractor.

Options Module

Figure 3C:
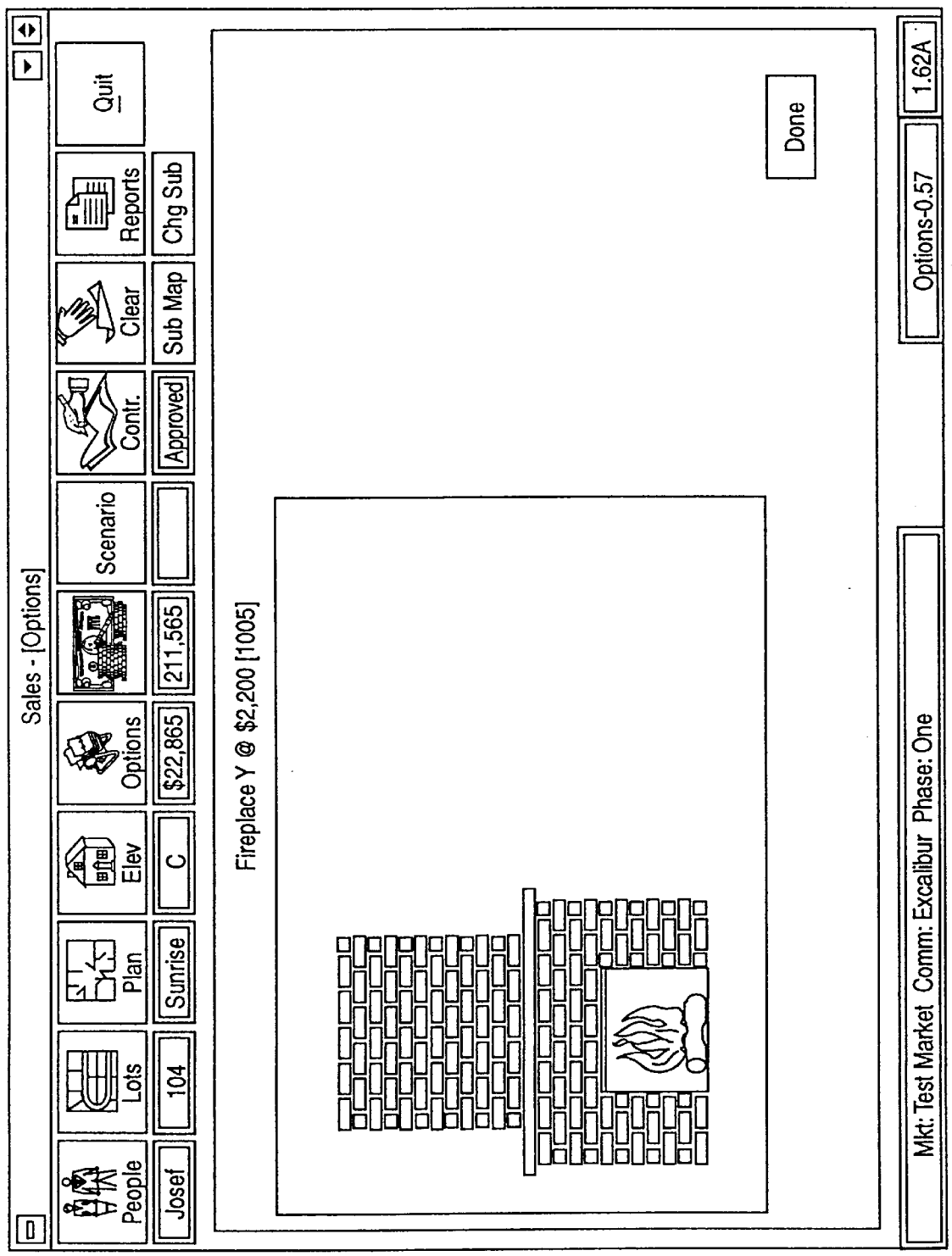

Once a floor plan has been selected, the system of the present invention allows various OPTIONS to be selected. These OPTIONS are discussed in conjunction with FIGS. 3A through 3C. In FIG. 3A, various OPTION categories are listed in a left-hand column wherein X's before various selections indicate that those OPTIONS have already been selected. The right-hand portion of FIG. 3A shows a running list of each OPTION selected, a quantity associated therewith, and a cost associated with each OPTION. The total cost of all of the selected OPTIONS is also shown in FIG. 3A.

FIG. 3B depicts the screen display which results from the selection the fireplace OPTION as it's set out in FIG. 3A. If the fireplace OPTION is selected in FIG. 3A, the viewer must select from one of the five fireplace OPTIONS set out in FIG. 3B. If the viewer is unfamiliar with the design of any of the fireplace OPTIONS at his disposal, one or more of the fireplace OPTIONS is selected for viewing. For example, if fireplace Y is selected for viewing, the screen as depicted in FIG. 3C is displayed to the user. Thus, a detailed reproduction of a photograph of the design fireplace Y is disclosed to the user for viewing. This type of high resolution graphics display associated with each one of the OPTIONS eliminates much of the guesswork associated with selecting OPTIONS, particularly in those cases where the potential buyer has not had an opportunity to view model homes constructed by the construction company offering the OPTIONS. With such a system, it is possible for a potential buyer to make informed decisions on OPTION selections without ever leaving the sales representatives office and without requiring the construction company to have previously built the OPTION at this subdivision.

Finance Module

When a potential buyer is contemplating the purchase of a home, the financial aspects of such a purchase are typically of significant importance. The FINANCIAL MODULE of the present invention assists potential buyers in determining their mortgage options, determining how much home they can afford, assist them in determining if they will qualify for the mortgage they're interested in, and assist in educating them of the tax benefits of purchasing the home. Each of these categories are set forth in the menu of selections of FIG. 4A. If the user selects the MORTGAGE OPTIONS selection of FIG. 4A, the screen of 4B is presented. If a conventional, fixed mortgage is of interest to the potential buyer, the appropriate data is input by the operator (if it has not already been input), and critical information is displayed to the user such as total monthly payment due, total move-in costs, etc. The FINANCE MODULE of the present invention is also designed to furnish similar information for conventional adjustable rate mortgages, FHA mortgages (adjustable rate and fixed), VA mortgages (adjustable rate and fixed) and other types of mortgage instruments. The FINANCE MODULE will calculate the maximum loan amount for any type of loan based on loan rules supplied to the module. The format for displaying the data associated with these latter mortgages is similar, or identical, to the format set on FIG. 4B.

Figure 4A:
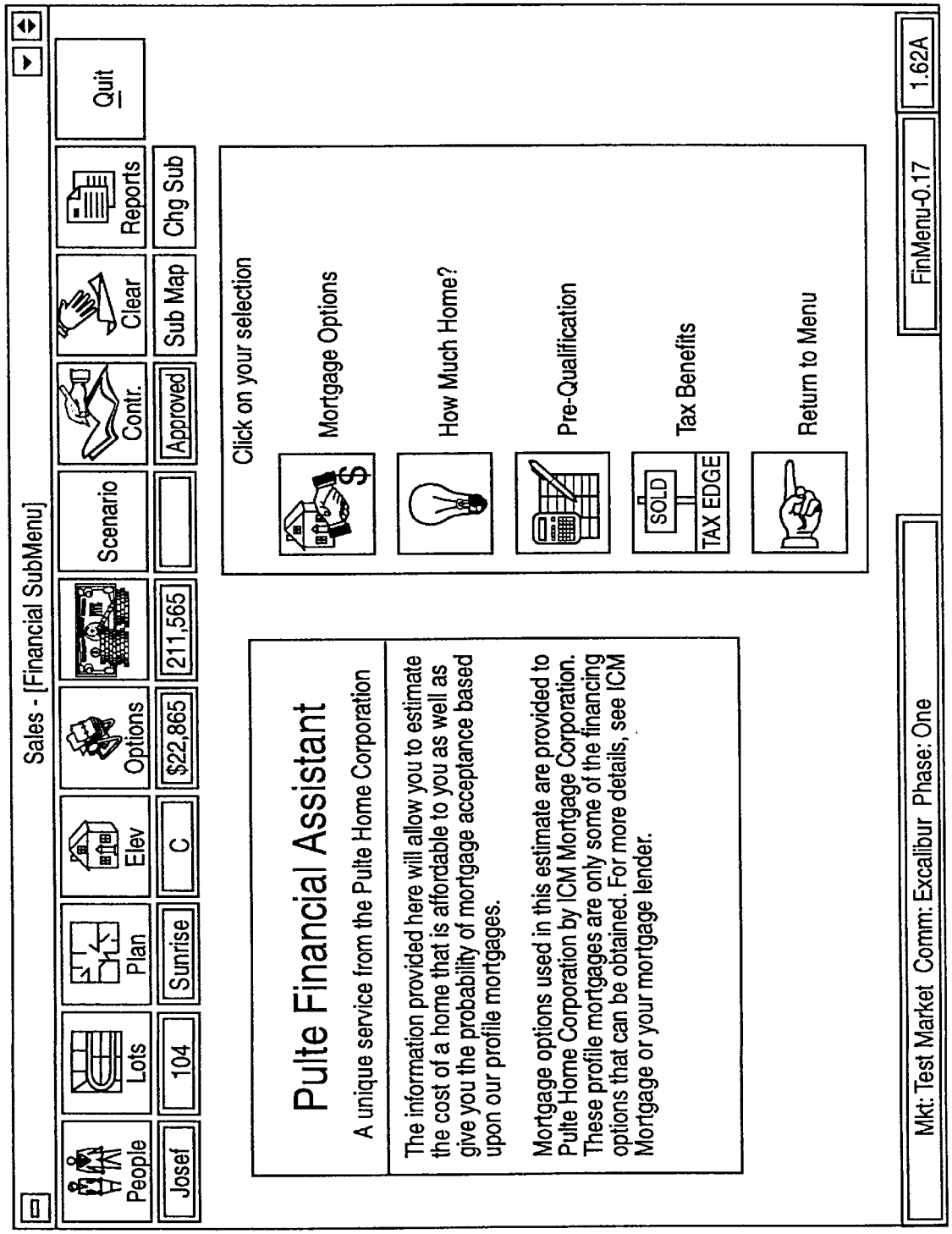

In FIG. 4A, if the user selects the HOW MUCH HOME option, the screen of FIG. 4C is displayed on the video display terminal wherein after the type of loan is selected 128 and other loan information and financial information 130, 132 respectively is provided, the user is provided with data reflective of how much home they can afford 134. If the potential buyer has already selected a home and various options, and now they want to determine if they prequalify for the home, the PREQUALIFICATION option of FIG. 4A is selected, the screen of FIG. 4D is displayed on the video display terminal. Using data supplied by the potential buyer and applying that data to well established formulas, the FINANCIAL MODULE indicates 134 to the potential purchaser whether he or she qualifies for the purchase of the home they have selected.

If the purchaser is interested in the tax benefits they receive from the purchase of a home, the TAX BENEFITS selection of FIG. 4A may be selected and the screen depicted in FIG. 4E will be displayed. This screen provides the potential purchaser with an indication of the estimated tax benefits associated with purchasing the home of interest.

Contract Module

Figure 9A:
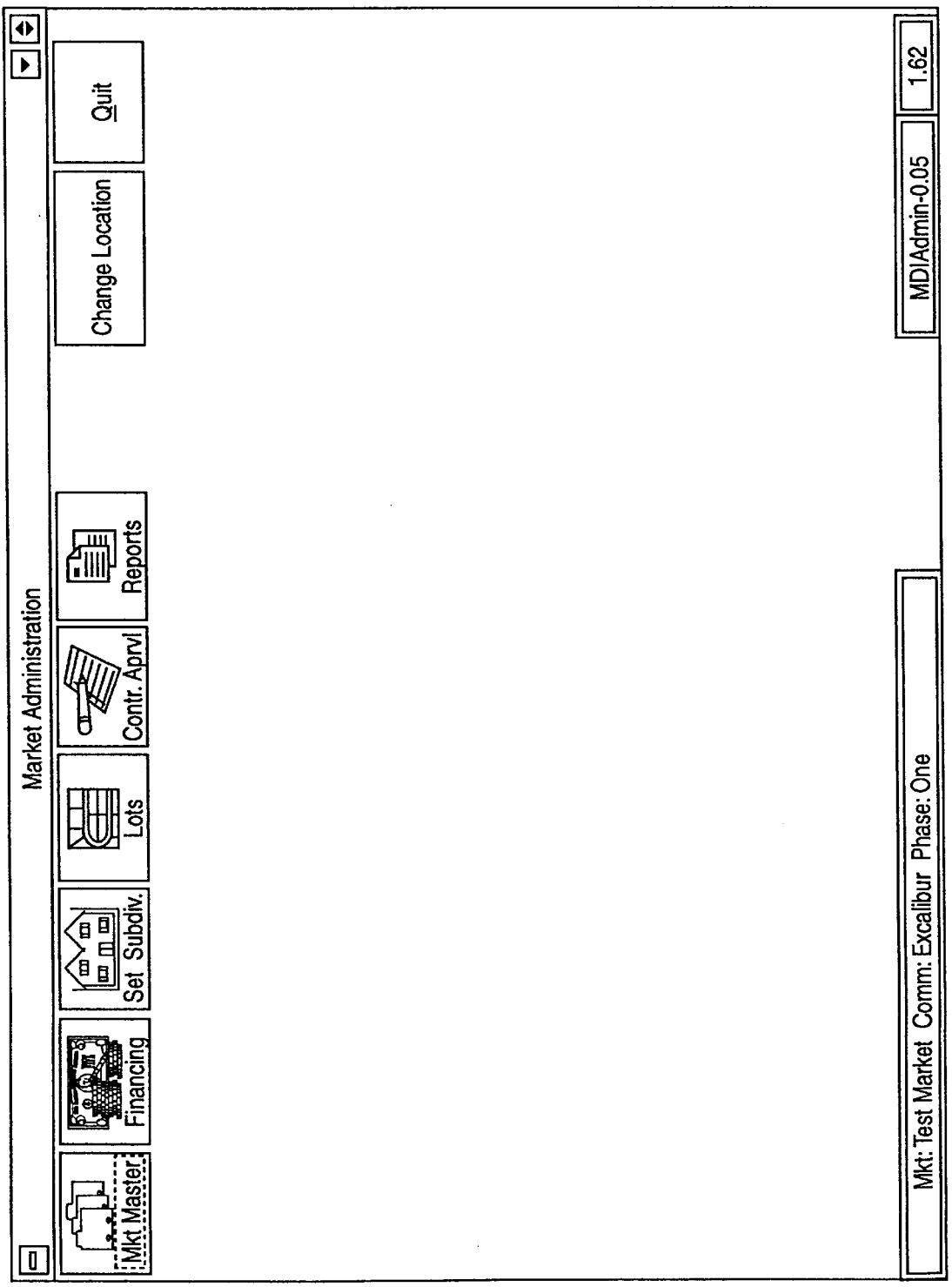

The CONTRACT MODULE of the present invention is the portion which is responsible for creating and tracking legal documents associated with the purchase of the home and selected options. Thus, when the user selects the CONTRACT MODULE (see selection 101 of FIG. 1B), the screen depicted in FIG. 9A is displayed on the video display terminal. The screen shows the existing contracts that exist for a particular customer plus any open "spec homes."

When the CREATE CONTRACT button is selected, the user is prompted for confirmation (see FIG. 5B) prior to creating the actual legal documents for the contract.

Figure 5A:
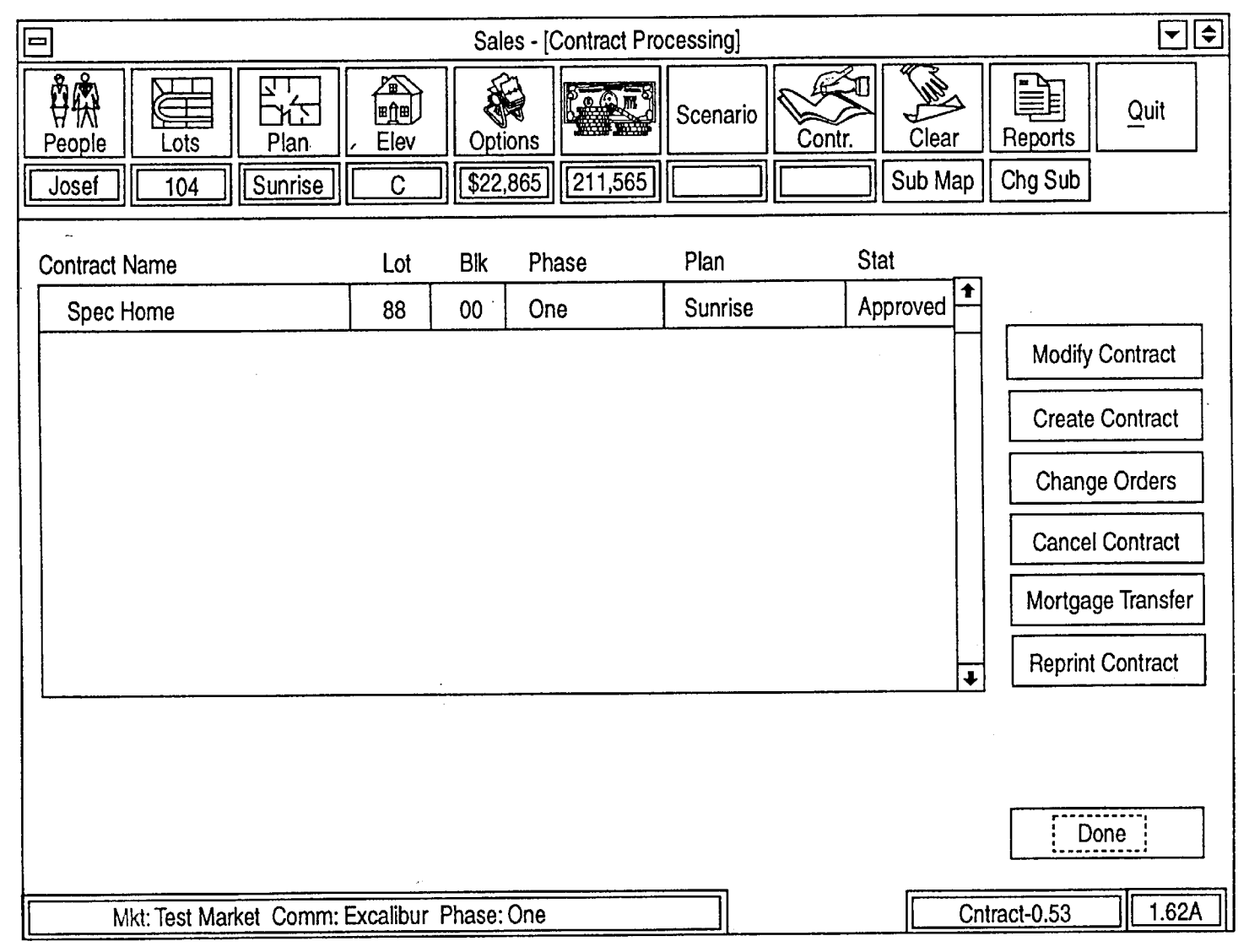

FIG. 5C summarizes the contract created for the customer and permits the user to make any refinements prior to printing the contract. These refinements may be selected by using one of the selections displayed on the right hand side of the screen display of FIG. 5C. For example, if the EDIT DETAIL button is selected, the screen of FIG. 5D is displayed which allows the user to change the base price of the home, the lot premium or the elevation premium. Comments pertinent to the contracting process that would be useful in the market office are entered on this screen.

If the OPTIONS button of FIG. 5D is selected, the screen as depicted in FIG. 5E is displayed giving the user the option of overriding any option price (if so enabled, by the market office). Payments received from a customer are entered by selecting the DEPOSITS button from FIG. 5C. FIG. 5F displays the screen associated with the entering of deposits.

Figure 5I:
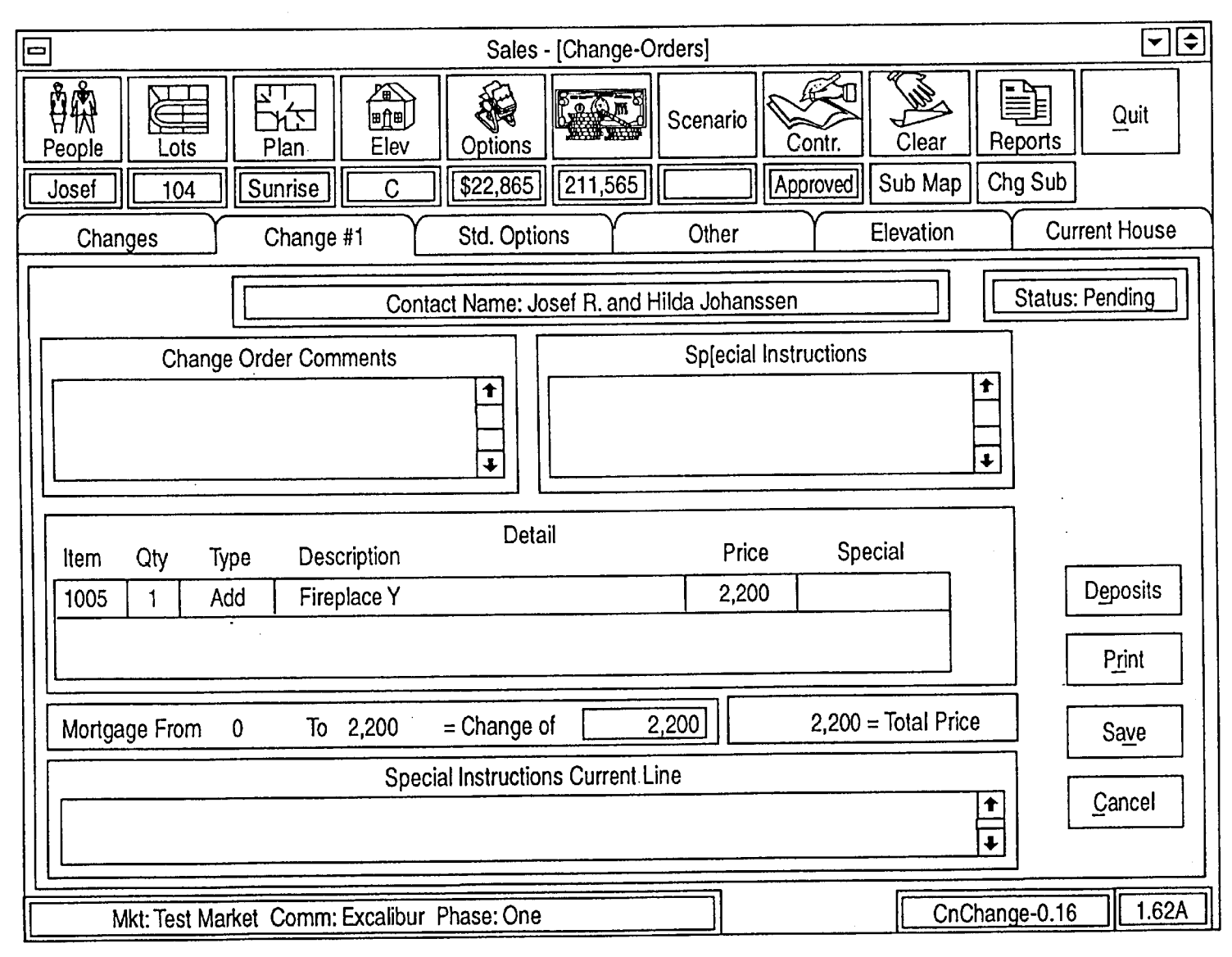

Once the contract is approved by the Market Office, the customer may elect to make certain changes in the contract. When the CONTRACT button is selected from the main sales menu, a revised EXISTING CONTRACTS screen, as shown in FIG. 5G is displayed. This screen permits the user to create and track change orders to the original contract. FIG. 5H identifies a change order being added to the original contract. After various options have been added, the change order may be reviewed as shown in FIG. 5I and FIG. 5J.

Information Transfer Module

Although the system as set forth can be implemented on a small scale basis (e.g. a single subdivision), it is equally capable of handling information flow throughout a network of sales offices, design centers, construction trailers, market offices, regional offices, and corporate offices. This aspect of the present invention will now be discussed in detail in conjunction with FIG. 6.

Figure 6:
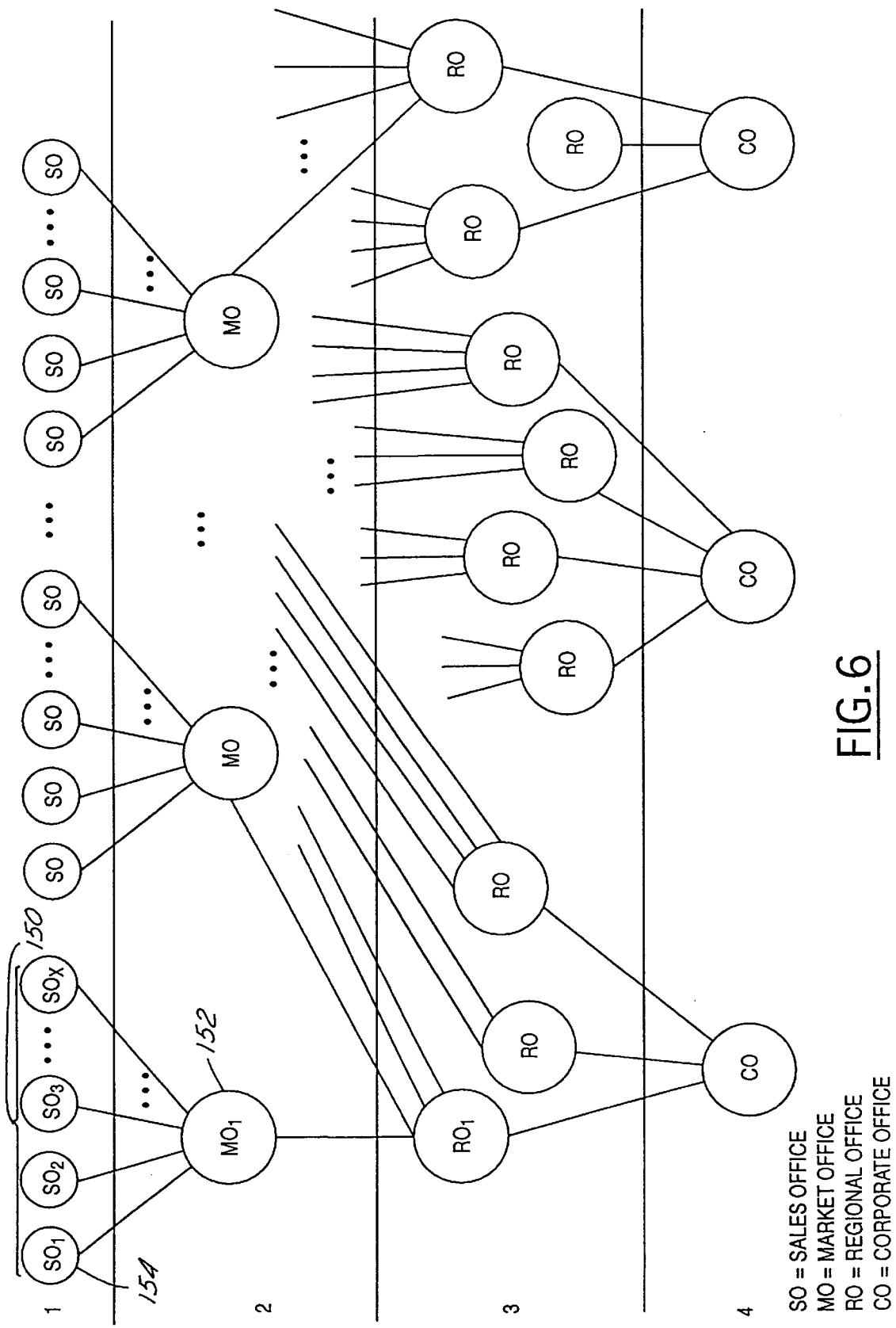
FIG. 6 depicts the operation of the INFORMATION TRANSFER MODULE of the present invention.

All of the modules set forth heretofore would typically be used at the sales office level to facilitate discussions which would typically take place between potential purchasers and sales associates. In the situation where a company has many subdivision developments ongoing at any one time, each sales office may be associated with one subdivision development. In this instance, it may be desirable for each sales office within a given territory to report to a single market office. A predetermined number of market offices may then be structured to communicate with a single regional office and lastly, a predetermined number of regional offices may be responsible for reporting to a single corporate office. This hierarchical arrangement is depicted in FIG. 6. The advantage of establishing such a hierarchy, is that certain decisions can be relegated to certain levels. For example, contract approvals may only take place at the market office level and not at the sales office level. Likewise, a regional office may review all sales by all Sales Offices to determine the performance of each sales associate at each Sales Office. Also, information may be put into the system at the Regional Office level to be filtered down to the Sales Offices. Thus, such information may include IRS tax rates and tax tables. In order for the hierarchical structure set forth in FIG. 6 to be of maximum benefit to each office involved, there must be a systematic process whereby information is updated (or synchronized) between the offices. For example, how can the regional offices be apprised of what models are their "best sellers" if they are not provided with information, on a regular basis, regarding the number and type of model sales taking place? Likewise, how can the sales offices keep potential purchasers up to date on the status of their home construction if the market office, charged with the duty of building the home, does not communicate that information to the respective sales office. Thus, a key aspect of the INFORMATION TRANSFER MODULE of the present invention is the system of INFORMATION TRANSFER which takes place between the offices whereby the hierarchy of offices is kept abreast of developments occurring amongst its parent office and its children offices. First, the method for transferring information from the children offices to the parent office will be discussed, then, the process of transferring information from the parent to the children offices will be set forth.

A) Children to Parent Data Transfer

Sales offices 150 depict a group of sales offices responsible for reporting to a single market office 152. Thus, in this manner, sales offices 150 are considered the children offices of market office 152 and likewise, market office 152 is considered the parent office of sales offices 150. We will now discuss, by way of example, how information is input at a given sales office and how that information is then transferred to the market office so that the market office is apprised of that particular transaction. In our example, let us suppose that a potential customer arrived at sales office subscript 154 and selected a lot, selected a home model, selected various options for that home model and provided the other necessary financial information that has been discussed in conjunction with the various modules. A data record is then constructed in one of the computers 18 (see FIG. 1A) associated with $SO_1$. This data record is preferably constructed by using a database that makes use of a distributed structure. Each data record is associated with a related data table. A typical structure for each data table is set forth below.

| | | | |
|---|---|---|---|
| 1. | Customer First Name | Text | 30 characters |
| 2. | Customer Last Name | Text | 30 characters |
| 3. | Customer Address | Text | 30 characters |
| 4. | Customer City | Text | 30 characters |
| 5. | Customer Zip Code | Text | 9 characters |
| 6. | Customer Number | Integer | 2 characters |
| 7. | Last Modified | Date/Time | 8 characters, packed |
| 8. | Last Modified By | Text | 6 characters |
| 9. | Last Modified By Site | Text | 10 characters |
| 10. | Unique Record ID | Numeric | 8 bytes, double precision |

The first six fields (all customer information) are typical fields within the structure and contain the dynamic information. The remaining four data fields are required for proper communication between a sibling office and a parent office and are modified according to the following rules:

1. When a new record is created:

The LAST MODIFIED field is updated with the system date/time of the actual modification.

The LAST MODIFIED BY field is updated with the "user id" or "log on name" of the person using the computer system. The "user id" is unique within any one given installation site that may consist of several networked computer systems.

The LAST MODIFIED BY SITE field is updated with the system generated UNIQUE SITE ID for the current location. A site will have one or more computer systems that are connected with a network device. The SITE ID is pre-assigned at a central location prior to the software being utilized.

The UNIQUE RECORD ID is generated at the site for each new data record that is generated. The UNIQUE RECORD ID is the single common link across all sites and its contents must be preserved for all future updates. Consequently, the UNIQUE RECORD ID field is only assigned on new records. It may be any unique number that mathematically combines the date/time the record was created.

2. When subsequent records are modified, all of the fields associated with the modified record are updated except for the UNIQUE RECORD ID.

3. When a record is deleted, a separate table is maintained that contains the table name, the UNIQUE RECORD ID of the original record, and the LAST MODIFIED BY SITE field. A new record is generated for each deleted record in the database. At a predetermined time (which is preferably during nonworking business hours), $SO_1$ initiates a database synchronization procedure to make certain that its database is in synchronization with the database $MO_1$ 152. In order to do this, $SO_1$ examines all of the data records in its database to determine which records have been changed since the last database synchronization took place. Each record that has been added or changed since the last database synchronization is copied into a redundant database. Records that are identified in the "delete log" table are also copied into the redundant database. Various ancillary files associated with each data record that have also been changed are flagged. These ancillary files contain miscellaneous information associated with any peculiar circumstances related to a potential buyer—such as the purchase of the home is contingent on the sale of his current home, or the like. This redundant database is then compacted and transferred to $MO_1$ 152 (the responsible parent). After the information is transferred to the parent, a confirmation message is sent by the parent to $SO_1$ 154 that the information has in fact been received and is being processed. Upon receipt of this confirmation, the following actions are performed at $SO_1$ 154:

A. The delete log is purged,

B. The last database sync date/time field is modified to reflect the current date/time and, C. $SO_1$ 154 polls the system for an incoming message consisting of changes that must be applied to the database of $SO_1$ 154 as commanded by $MO_1$ 152.

At a later time, $MO_1$ 152 (the parent) is assured of having all of the transactions from $SO_1$ through $SO_x$—the subordinate children. At this point, $MO_1$ 152 processes each of the subordinate children's records in the redundant database against the database residing at $MO_1$ 152. In doing this, first the deleted records are processed and deleted from $MO_1$'s database. Subsequently, additional records are added and/or modified in $MO_1$'s database in accordance with the last modified date/time field.

B) Parent to Children Data Transfers

Still, at a later predetermined time, $MO_1$ examines its database for any additions, deletions, or changes which may have been initiated at $MO_1$ or initiated by $RO_1$. These additions, changes, or deletions, are placed in a redundant database which is set up for each particular subordinate children site. Data records that have the "last modified by site" value that is the same as the subordinate children's site are discarded inasmuch as it is known that these records originated from that site. This redundant database with any ancillary data files is then transferred electronically to the respectively associated subordinate child. This process repeats itself with the parent becoming the subordinate child and additional transactions are prepared for additional sites.

In view of the above discussion, it has been demonstrated that the system of the present invention is effective for taking a plurality of disbursed databases and synchronizing these databases with other databases associated therewith. It is important to note that only records which have been altered, in some way, are transferred for updating thus eliminating the time consuming task of transferring all database records, even those which have not been altered in any way. In this aspect, the data synchronization method of the present invention is extremely efficient.

Overall Entry Module

Figure 7A:
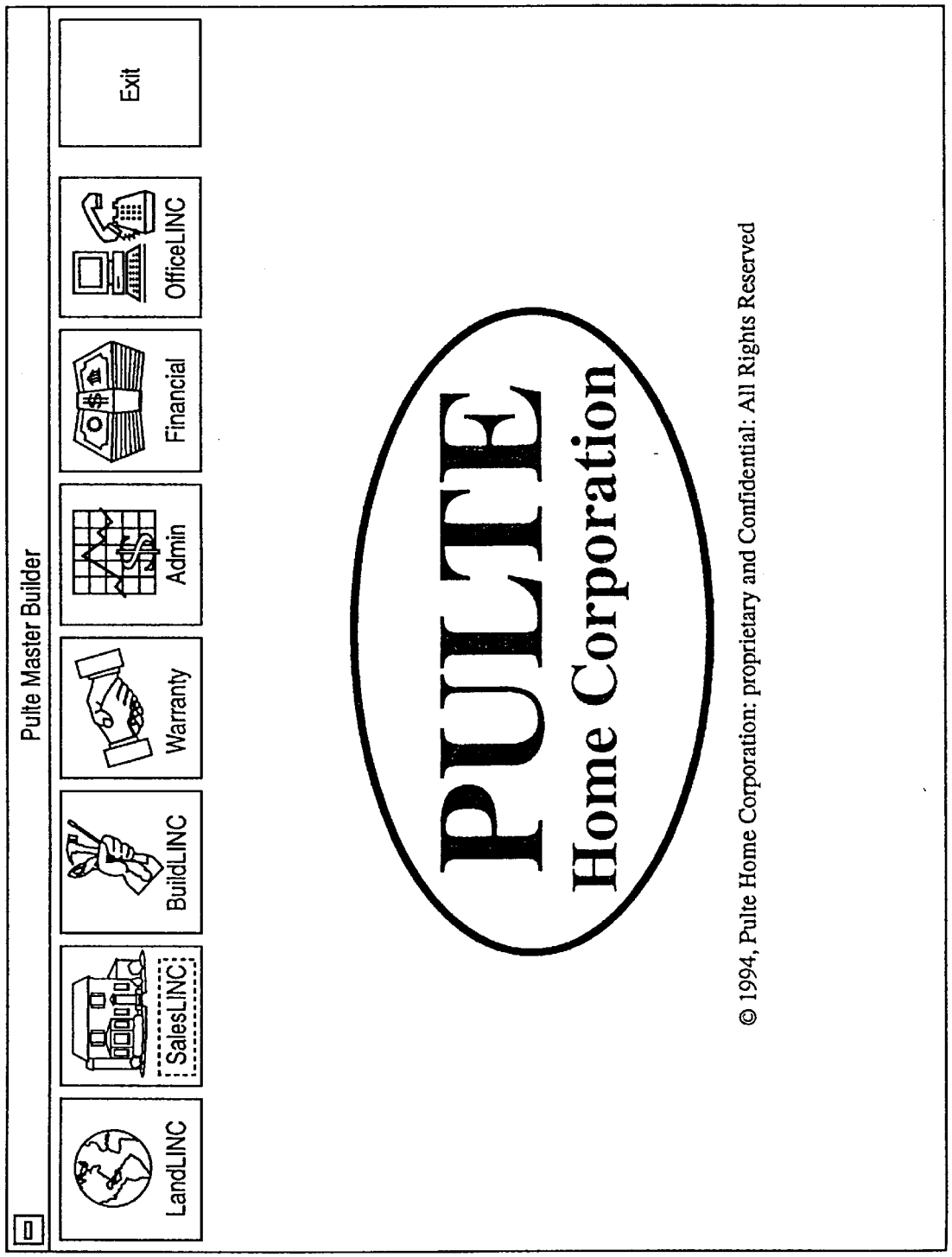
FIGS. 7A and 7B depict a preferred ENTRY MODULE of the present invention.

FIG. 7A depicts the OVERALL ENTRY MODULE of the present invention which is preferably adapted to run on any IBM PC compatible capable of running Microsoft Windows.

Figure 7B:
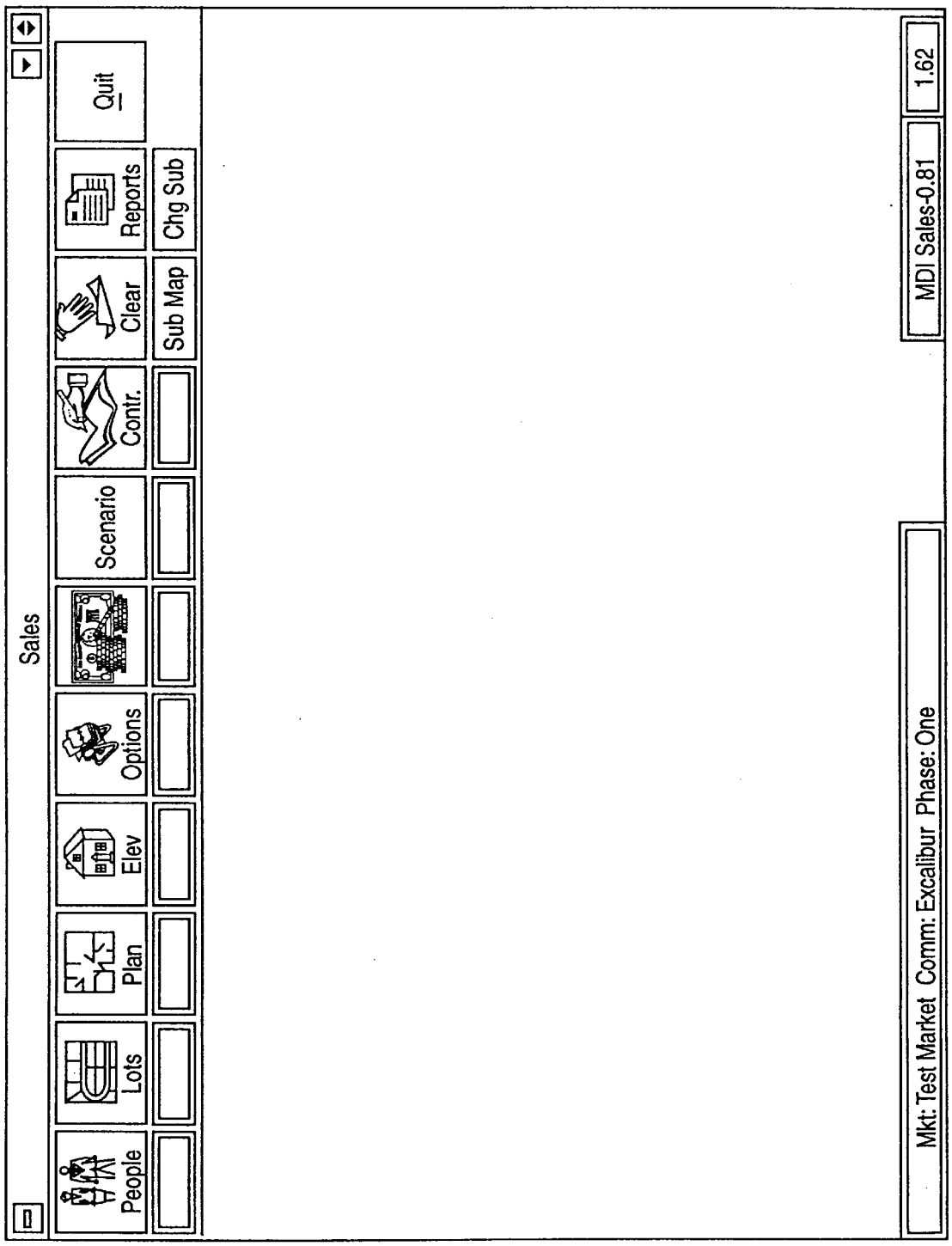

The OVERALL ENTRY MODULE is displayed when the system is first booted and provides a method of entering the Land, Sales, Build (or construction), Warranty, Administration, Financial, or Office LINC Subsystems. The SALES SUBSYSTEM is selected by positioning an indicator on the SALES Icon and then activating the selection. This positioning/activation sequence is typically implemented by way of a "mouse" control, but any other technique for allowing a user to select from a menu of options is also contemplated, including selection by a person's finger. After selection, the screen set forth in FIG. 7B is displayed confirming that (in this particular example) the SALES Subsystem has been selected.

People Information Module

FIGS. 8A–8E depict the PEOPLE INFORMATION MODULE of the present invention. The PEOPLE INFORMATION MODULE is selected by positioning a screen indicator over the PEOPLE icon and activating it. The user is prompted for a customer's last name or phone number (see FIG. 8A). As characters are entered into the last name field (see FIG. 8B) those customers that "match" the information in the last name field are displayed for further selection.

Figure 8C:
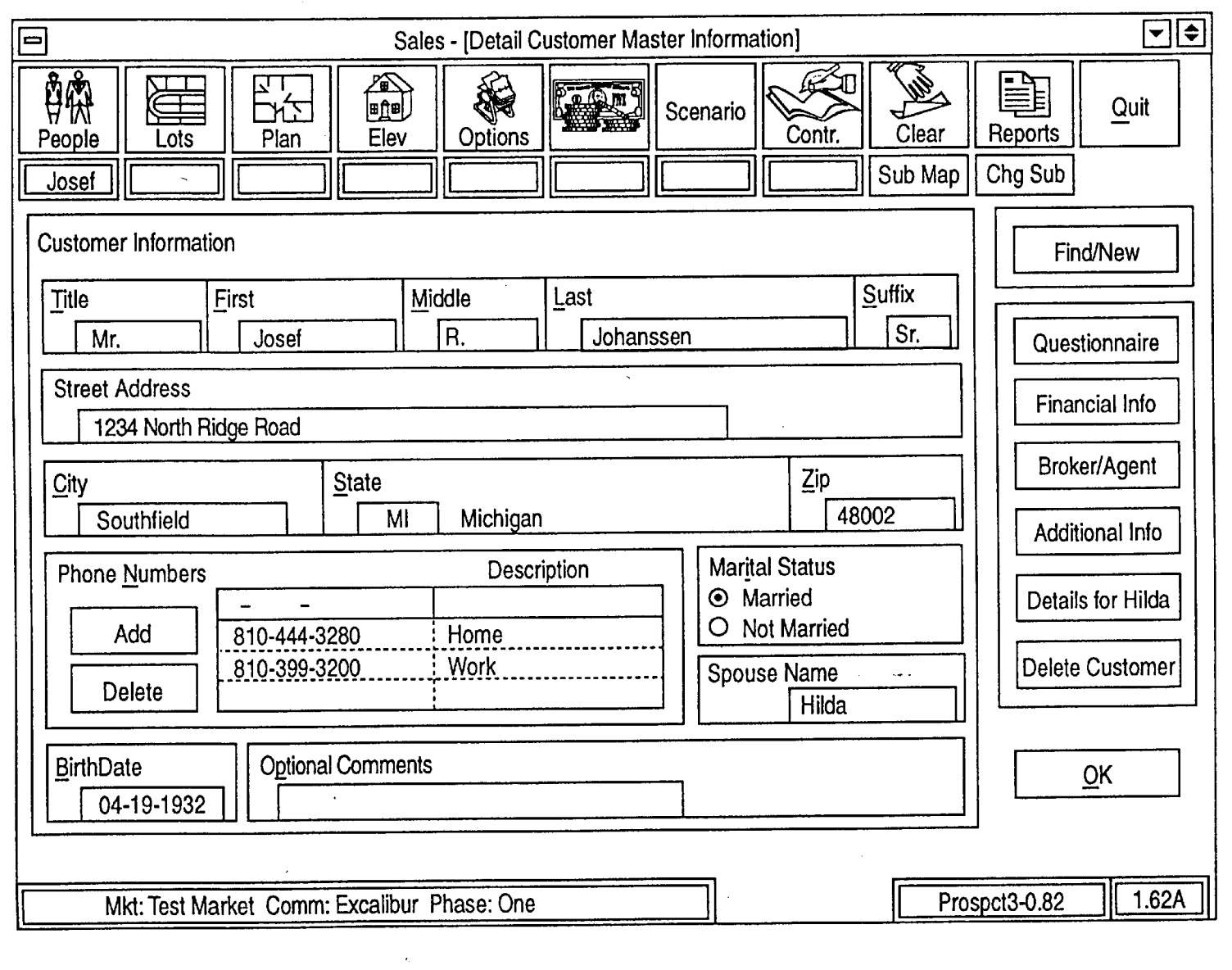

FIG. 8C shows the PEOPLE INFORMATION screen that is displayed after a prospect is selected and the current information is given. If the prospect is a new prospect, the screen is given with only the customer's last name. The user then enters the information on the screen. All of the information displayed on the screen is optional and the system will function with only the customer's last name. The system is designed so that a customer may have in excess of 1000 telephone numbers associated with their name.

FIG. 8D discloses a further screen of the PEOPLE INFORMATION MODULE which allows a user to access/enter certain financial information about a customer. This information is used in determining if a customer qualifies for a particular home and is also used to determine the maximum amount of a loan that a customer could obtain for a particular home.

Figure 8E:
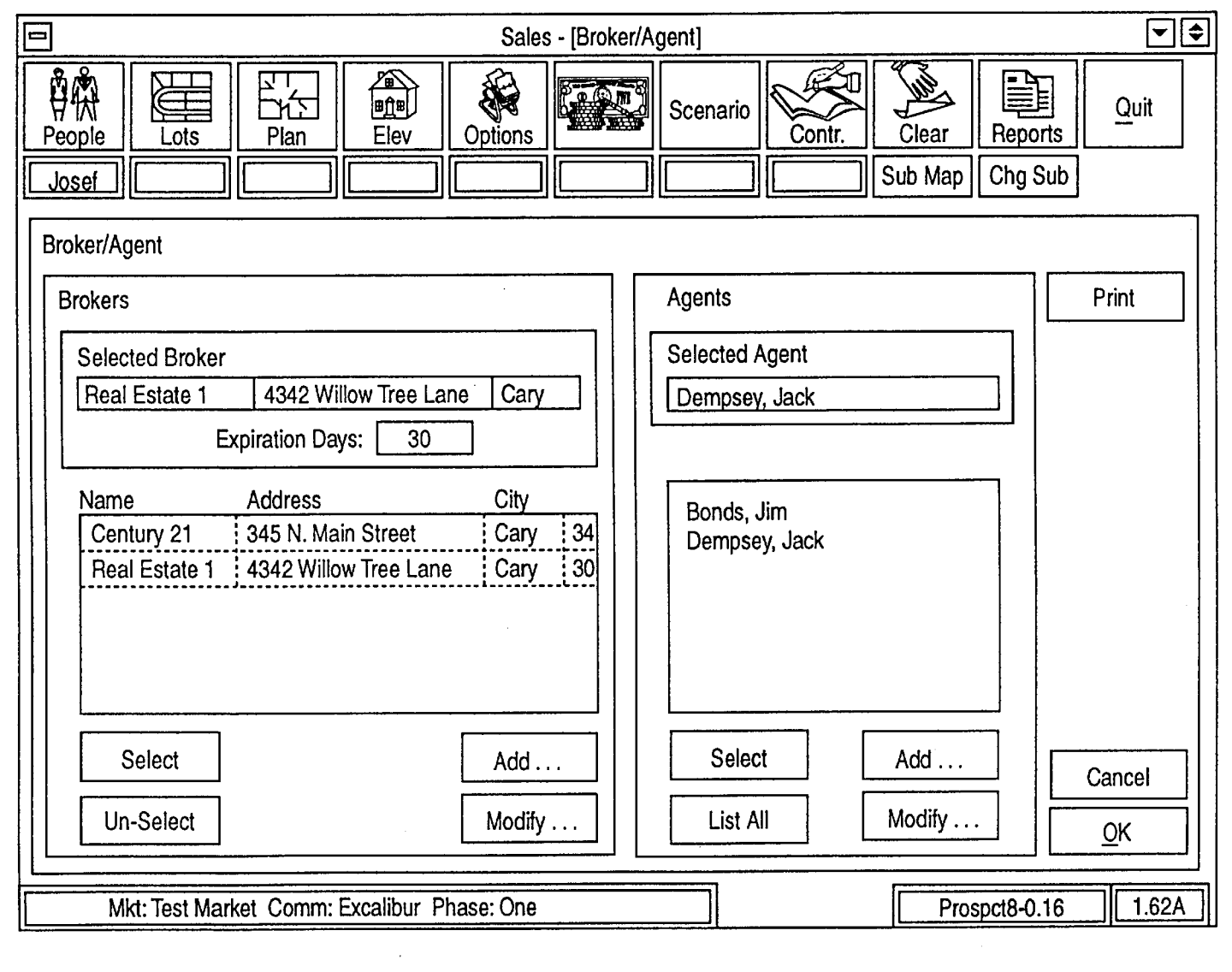

If the customer is a real estate broker, the sales associate selects the broker button (see FIG. 8C) and selects the appropriate broker/agent (see FIG. 8E). If a particular broker/agent does not exist, the sales associate may add the broker/agent.

Figure 8F:
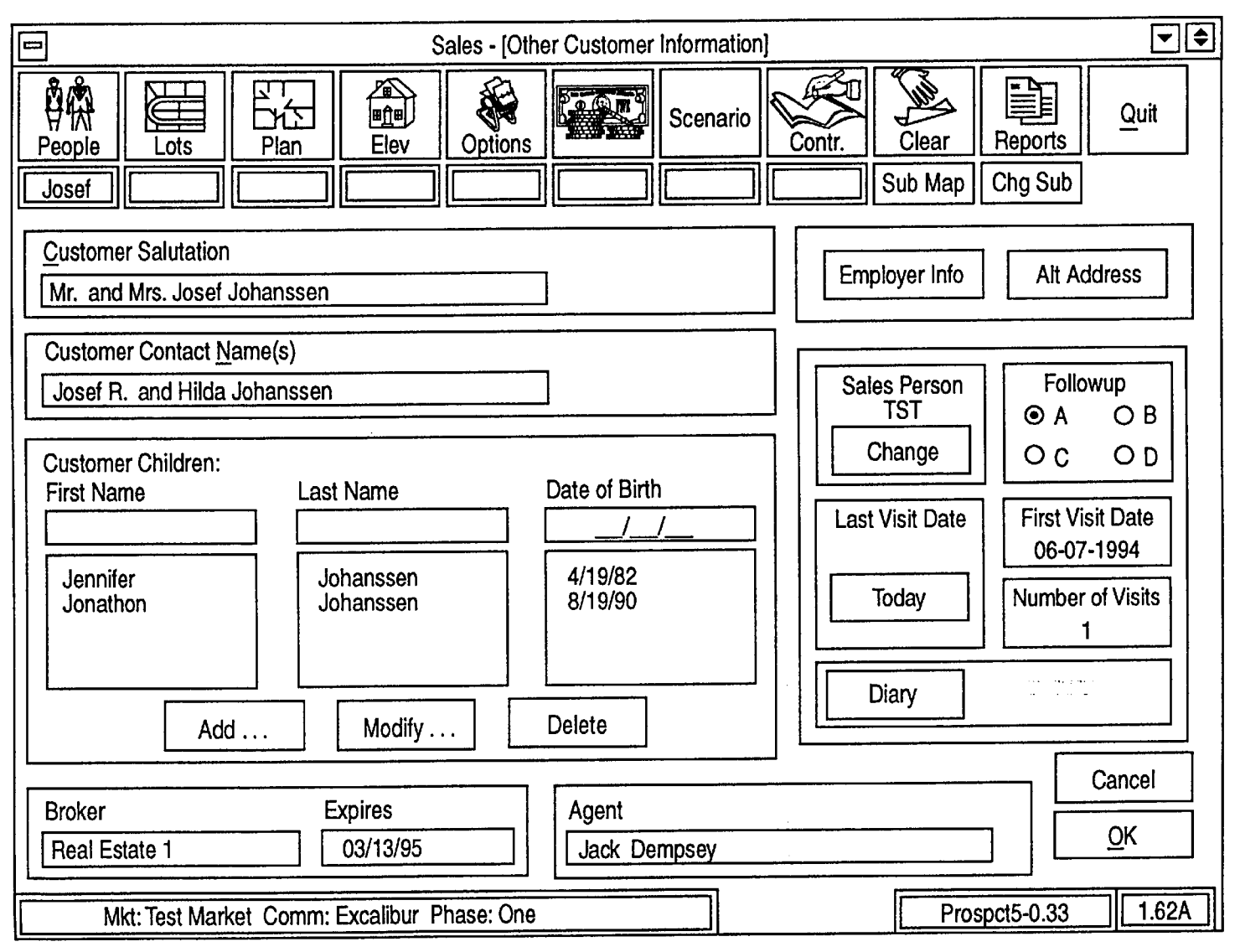

Additional information associated with the customer is assessed through the PEOPLE INFORMATION MODULE screen of FIG. 8F. The names and birthdates of the customer's children, employer information, and alternate addresses for the customer are entered/maintained through this screen. In addition, the user may select the "diary" button to enter a log regarding customer activities. For example, a short synopsis of a phone call, letter, or visit from a customer may be entered. Thus, at a later date the user may review previous correspondence with the customer. Previous selections made by the customer may be recalled by depressing the SCENERIO button.

Administration Sysytem

The ADMINISTRATION SYSTEM contains several modules associated with the maintenance of certain data files regarding this invention. The primary modules associated with this system are shown in FIG. 9A, which is displayed when the "ADMIN" icon is selected from the main selection module (see FIG. 7A).

Figure 9B:
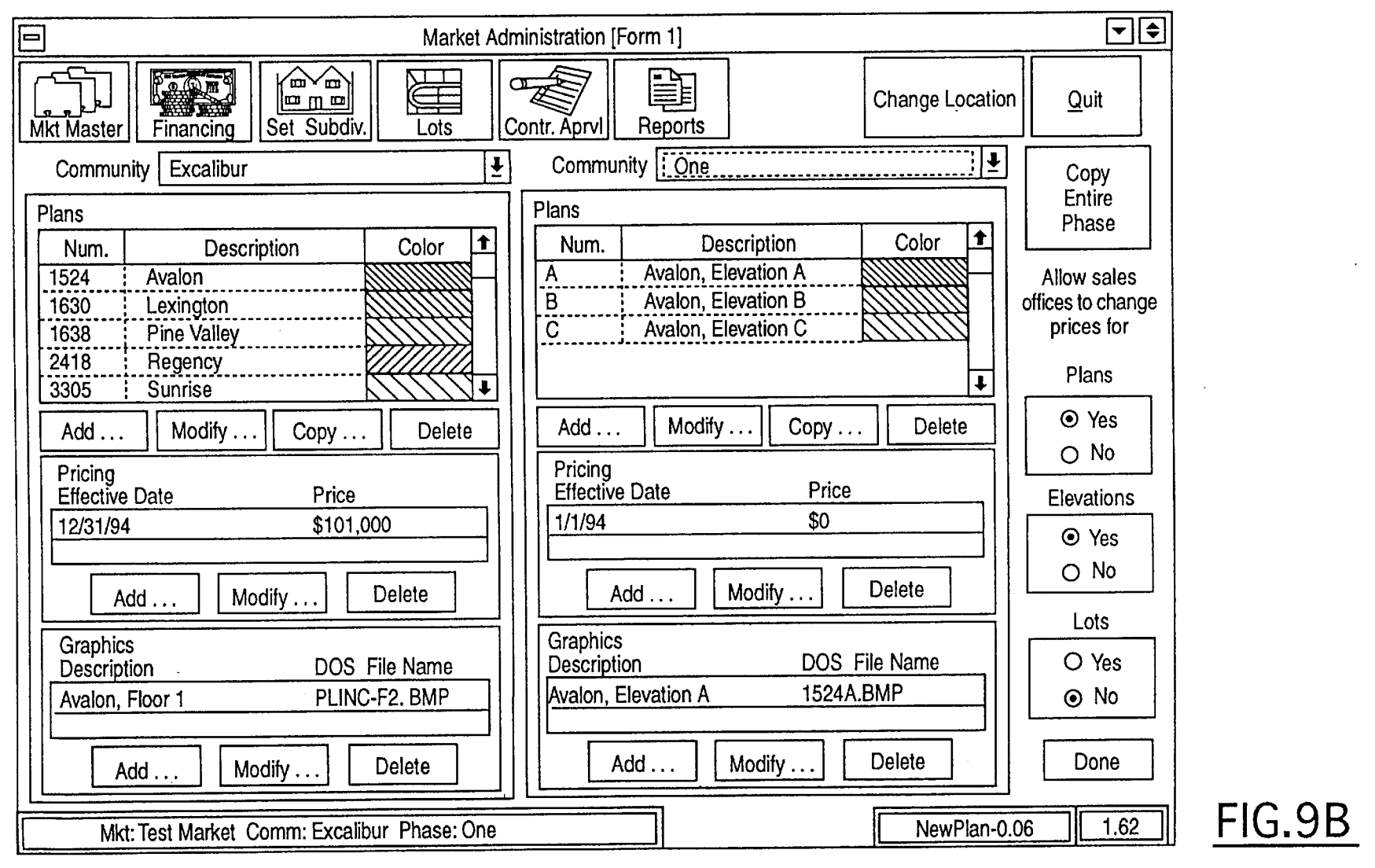

By way of example, when the Market Master icon is selected (see FIG. 9A), and a sub-menu of "PLANS/ELEVATIONS" is selected, a screen associated with the associated plans and elevations for a particular subdivision is displayed as shown in FIG. 9B. This screen permits the user to change the pricing of a plan, identify the file name depicting the graphic for the plan, add or change information for an elevation, change pricing (including future pricing) for an elevation, and graphics file names.

Another example of the ADMINISTRATION SYSTEM is the CONTRACT APPROVAL MODULE which is displayed when the CONTRACT icon is selected. The screen of FIG. 9C displays all open contracts and change orders that require approval before they may be ratified.

Figure 9D:

A third example of the ADMINISTRATION SYSTEM is the FINANCING MODULE which is displayed when the FINANCING icon is selected and the LOAN MAINTENANCE sub-menu is selected. The screen in FIG. 9D is displayed whereby a loan fee maybe entered as a loan specific fee or a subdivision specific fee. The loan fee is then entered as a fixed or base amount plus a VARIABLE AMOUNT of either the HOUSE COST or the LOAN AMOUNT. Fees are further described as one-time, yearly, or monthly.

These fees are typically supplied by a mortgage company and are electronically transmitted to the related SALES OFFICES by the DATA LINC system.

Conclusion

The foregoing detailed description shows that the preferred embodiments of the present invention are well suited to fulfill the objects of the invention. It is recognized that those skilled in the art may make various modifications or additions to the preferred embodiments without departing from the spirit of the present invention. Accordingly, it is to be understood that the subject matter sought to be afforded protection hereby should be deemed to extend to the subject matter defined in the appended claims including all fair equivalents thereof.

We claim:

1. A system for displaying plat status information to a viewer, comprising:

displaying, on a video display terminal, a plurality of polygons, each polygon representing a respectively associated plat, selecting a status in association with each plat, displaying upon each of said polygons a coding indicia indicative of the status assigned to the plat of each respectively associated polygon.

2. The system of claim 1, wherein said status relates to the completion of discrete phases of constructing a home respectively associated with each said plat.

3. The system of claim 1, wherein said status relates to the completion of discrete phases of selling a home respectively associated with each said plat.

4. A system for facilitating tracking information associated with selling and constructing homes, comprising:

computer means, means, coupled with said computer means, for displaying plat information relating to said homes, means, coupled with said computer means, for displaying information related to the design of said homes, means, coupled with said computer means, for displaying information related to options associated with said homes, means, coupled with said computer means, for displaying mortgage information relating to the purchase of said homes, means, coupled with said computer means, for displaying information related to a contract associated with the sale of said homes.

\* \* \* \* \*